United States Patent
Lim et al.

(10) Patent No.: US 11,663,540 B2
(45) Date of Patent: *May 30, 2023

(54) AD HOC GROUP MANAGEMENT WITHIN A COLLABORATION PROJECT SHARING WORKFLOW

(71) Applicant: Adobe Inc., San Jose, CA (US)

(72) Inventors: Ang Tiong Lim, Lake Forest Park, WA (US); Lawrence Hsu, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,702

(22) Filed: Dec. 7, 2021

(65) Prior Publication Data

US 2022/0101242 A1 Mar. 31, 2022

Related U.S. Application Data

(63) Continuation of application No. 16/506,637, filed on Jul. 9, 2019, now Pat. No. 11,210,615.

(51) Int. Cl.
*G06Q 10/0631* (2023.01)
*G06Q 10/0633* (2023.01)

(52) U.S. Cl.
CPC . *G06Q 10/063118* (2013.01); *G06Q 10/0633* (2013.01)

(58) Field of Classification Search
CPC ........................................... G06Q 10/00–50/00
USPC .............................................. 705/7.11–7.42
See application file for complete search history.

(56) References Cited

U.S. PATENT DOCUMENTS

| | | | | |
|---|---|---|---|---|
| 5,233,687 A | * | 8/1993 | Henderson, Jr. ...... | G06F 3/0481 715/788 |
| 8,341,532 B2 | * | 12/2012 | Ryan ..................... | G06Q 10/10 715/752 |
| 8,392,962 B2 | * | 3/2013 | Grason ................ | G06F 40/143 726/4 |
| 8,561,153 B2 | * | 10/2013 | Grason ................ | G06F 16/958 715/741 |

(Continued)

OTHER PUBLICATIONS

"First Action Interview Office Action", U.S. Appl. No. 16/506,637, dated Apr. 15, 2021, 19 pages.

(Continued)

*Primary Examiner* — Alan S Miller
(74) *Attorney, Agent, or Firm* — FIG. 1 Patents

(57) ABSTRACT

A content collaboration system displays a UI allowing a project owner to create and edit a collaboration project, and share the collaboration project with other users. To share the collaboration project, the project owner starts a sharing workflow by providing a user input to the collaboration system UI. The sharing workflow allows the project owner to identify other users with which to share the collaboration project. As part of the sharing workflow, the project owner can input a request via the collaboration system UI to manage (e.g., create or edit) a group of users. In response to such a request, the collaboration system UI causes the group to be created or changed as requested. In response to a request to share the collaboration project with the group the collaboration system UI causes an invitation to access the collaboration project to be sent to the members of the group.

20 Claims, 24 Drawing Sheets

(56) References Cited

U.S. PATENT DOCUMENTS

| | | | |
|---|---|---|---|
| 9,344,288 B2* | 5/2016 | Deibler | H04L 12/1822 |
| 10,389,769 B2* | 8/2019 | Gudipaty | G06F 3/0482 |
| 11,210,615 B2 | 12/2021 | Lim et al. | |
| 2003/0227487 A1* | 12/2003 | Hugh | G06F 16/9024 |
| | | | 707/E17.011 |
| 2005/0021629 A1* | 1/2005 | Cannata | G06Q 10/10 |
| | | | 709/205 |
| 2005/0216556 A1* | 9/2005 | Manion | H04L 67/104 |
| | | | 709/204 |
| 2006/0010125 A1* | 1/2006 | Beartusk | G06Q 10/10 |
| 2006/0059253 A1* | 3/2006 | Goodman | G06Q 10/10 |
| | | | 709/223 |
| 2006/0221858 A1* | 10/2006 | Switzer | G06F 9/451 |
| | | | 370/254 |
| 2007/0124373 A1* | 5/2007 | Chatterjee | G06Q 10/10 |
| | | | 709/204 |
| 2008/0046442 A1* | 2/2008 | Grason | G06F 40/143 |
| 2008/0288914 A1* | 11/2008 | Schmitter | G06Q 10/06 |
| | | | 717/101 |
| 2009/0171726 A1* | 7/2009 | Johnson | G06Q 40/04 |
| | | | 705/321 |
| 2009/0192845 A1* | 7/2009 | Gudipaty | G06F 3/04842 |
| | | | 715/733 |
| 2009/0222743 A1* | 9/2009 | Hadfield | H04L 12/1822 |
| | | | 715/753 |
| 2009/0265634 A1* | 10/2009 | Beringer | G06Q 10/10 |
| | | | 709/204 |
| 2009/0307605 A1* | 12/2009 | Ryan | G06Q 10/10 |
| | | | 715/751 |
| 2011/0153759 A1* | 6/2011 | Rathod | G06Q 30/0269 |
| | | | 709/204 |
| 2011/0264483 A1* | 10/2011 | Nezhad | G06Q 10/103 |
| | | | 715/738 |
| 2012/0030729 A1* | 2/2012 | Schwartz | H04L 63/105 |
| | | | 726/1 |
| 2013/0174229 A1* | 7/2013 | Grason | G06F 16/958 |
| | | | 726/4 |
| 2013/0275312 A1* | 10/2013 | Claman | G06Q 10/103 |
| | | | 705/301 |
| 2014/0245162 A1* | 8/2014 | Deibler | G06Q 10/103 |
| | | | 709/204 |
| 2015/0281372 A1* | 10/2015 | Wilson | H04L 67/141 |
| | | | 709/227 |
| 2016/0112476 A1* | 4/2016 | Gudipaty | G06Q 10/10 |
| | | | 715/753 |
| 2016/0148158 A1* | 5/2016 | Marth | G06Q 30/0243 |
| | | | 705/14.72 |
| 2018/0205676 A1* | 7/2018 | Goyal | H04L 51/04 |
| 2019/0379534 A1* | 12/2019 | Crowley | H04L 9/0861 |
| 2020/0159950 A1* | 5/2020 | Bodin | G06Q 10/101 |
| 2021/0012270 A1 | 1/2021 | Lim et al. | |

OTHER PUBLICATIONS

"Non-Final Office Action", U.S. Appl. No. 16/506,637, dated Nov. 30, 2020, 17 pages.

"Notice of Allowance", U.S. Appl. No. 16/506,637, dated Aug. 18, 2021, 7 pages.

"Pre-Interview First Office Action", U.S. Appl. No. 16/506,637, dated Jan. 8, 2021, 19 pages.

* cited by examiner

AD HOC GROUP MANAGEMENT WITHIN A COLLABORATION PROJECT SHARING WORKFLOW

RELATED APPLICATIONS

This application is a continuation of U.S. patent application Ser. No. 16/506,637, filed Jul. 9, 2019, the disclosure of which is hereby incorporated by reference herein in its entirety.

BACKGROUND

As technology has advanced, computing devices have found many uses in our lives. One such use is to allow different people to collaborate on different projects, such as the creation of various different types of digital content (e.g., images, video, audio and so forth). Different people can collaborate on a project, such as co-workers, a designer and another user who requested that the digital content be created, and so forth.

Some collaboration systems have a sharing user interface that allows an owner of the collaboration project to obtain a link to the collaboration project that can be communicated to other users via email. The project owner can also identify one or more individual users (e.g., by their email addresses) with which the collaboration project is to be shared. While such collaboration systems are beneficial to users, they are not without their problems. One such problem is that the project owner is limited to entering email addresses of individual users. This can be burdensome on the project owner, especially in situations where the project owner is repeatedly updating the project and sharing updated versions of the project with multiple people. This burden on the project owner can lead to project owner frustration and dissatisfaction with the collaboration system.

SUMMARY

To mitigate the drawbacks of conventional collaboration systems, a project collaboration system as implemented by a computing device is described to provide ad hoc group management within a collaboration project sharing workflow. A user request to initiate a sharing workflow for a collaboration project is received, and in response to the user request a group management option is displayed as part of the sharing workflow. A first user input selecting the group management option is received as part of the sharing workflow, a second user input specifying at least one member to be included in a group or a change to be made to the group is also received as part of the sharing workflow, and the group is caused to be created or changed in accordance with the second user input. A user request to share the collaboration project with the group is also received as part of the sharing workflow and an invitation to access the collaboration project is caused to be sent to each member of the group.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
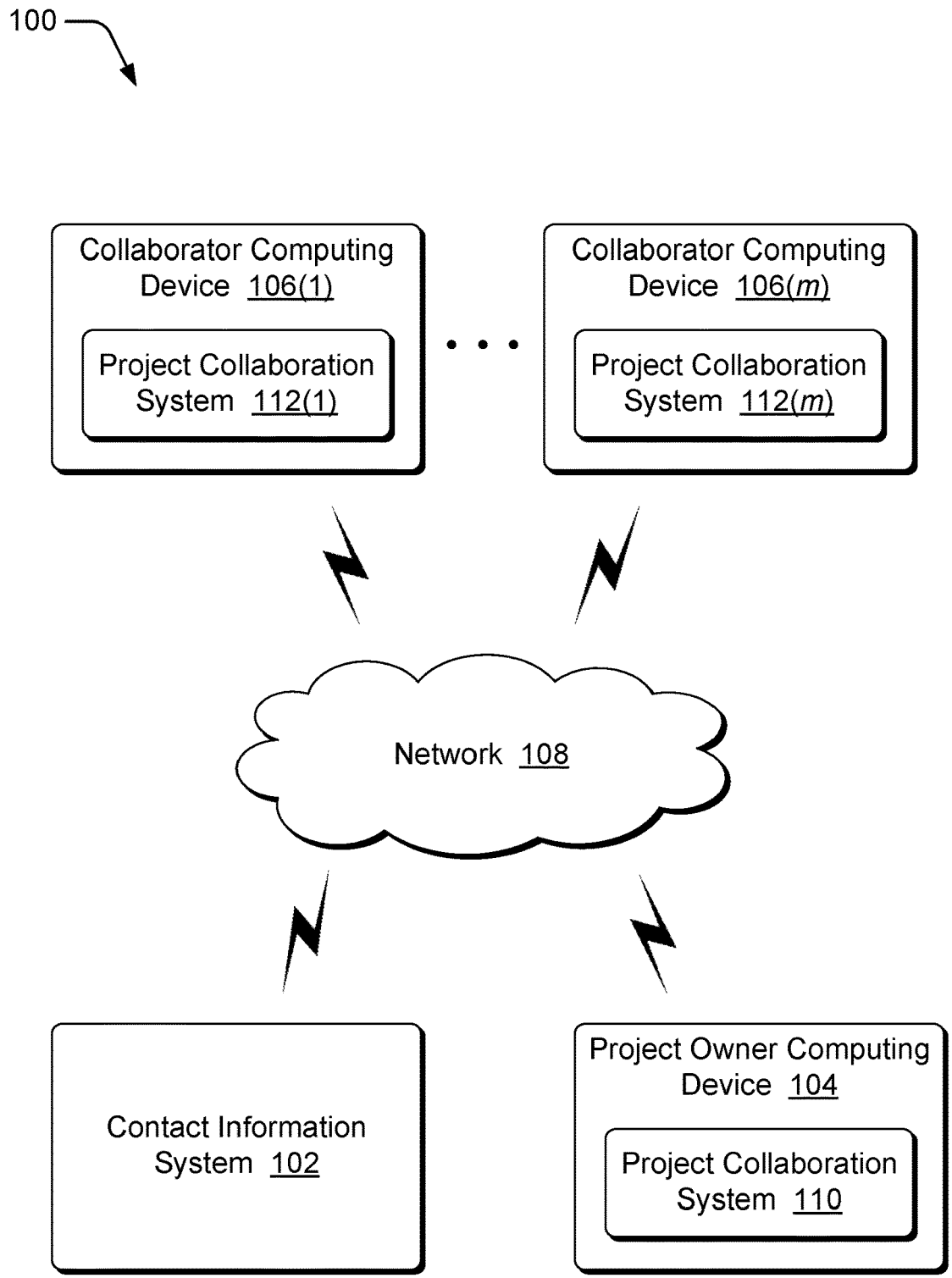
FIG. 1 is an illustration of a digital medium environment in an example implementation that is operable to employ the ad hoc group management within a collaboration project sharing workflow described herein.

Ad hoc group management within a collaboration project sharing workflow is discussed herein. Generally, a content collaboration system displays a user interface (UI) allowing a user, referred to as the project owner, to create and edit a collaboration project, and share the collaboration project with other users. Such collaboration projects can include, for example, the creation and editing of digital content (e.g., text, images, video, audio and so forth), the establishment and maintaining of video (or audio) conferences, and so forth. To share the collaboration project, the project owner starts a sharing workflow by providing a user input to the collaboration system UI. The sharing workflow refers to the different views (e.g., screens or windows) displayed by the collaboration system UI that allow the project owner to share the collaboration project with other users.

The sharing workflow allows the user to identify one or more other users with which to share the collaboration project. As part of the sharing workflow, the user can input a request via the collaboration system UI to manage (e.g., create or edit) a group. A group refers to a collection of multiple individual users (e.g., names, email addresses, or other identifiers of multiple individual users). In response to the request to manage a group, the collaboration system UI causes the group to be created or changed as requested. In response to a request to share the collaboration project with the group the collaboration system UI causes an invitation to access the collaboration project to be sent to the members of the group. Thus, the project owner is able to manage a group as part of the sharing workflow via the collaboration system UI.

More specifically, the collaboration system UI displays various different views to the project owner allowing the project owner to provide user input to manage groups. In one or more implementations, the collaboration system UI displays multiple views allowing the user to create a group as part of the sharing workflow. For example, the views can allow a user to select an option to create a new group, specify a name of the group, specify a description of the group, specify members of the group, specify permissions for the group, create the group with the specified information, and cause an invitation to access the collaboration project to be sent to the members of the group.

Additionally or alternatively, the collaboration system UI displays multiple views allowing the user to edit a group as part of the sharing workflow. For example, the views can allow a user to select an option to edit a previously created group, specify which of multiple previously created groups to edit, input a change to the name of the group, input a change to the description of the group, input a change to members of the group (e.g., add or delete members), input a change to permissions for the group, and cause the changes to the group to be saved.

Conventional group management systems have a dedicated group management workflow, displayed in a dedicated group management UI that is separate from any other UI or workflow (e.g., separate from a collaboration project sharing workflow). This causes, for example, a user that is using a collaboration project sharing workflow that wants to manage a group to leave the collaboration project sharing workflow, enter the group management workflow (e.g., via a separate application or UI), and then return to the collaboration project sharing workflow upon completion of the group management tasks. In contrast, the techniques discussed herein allow groups to be managed in the sharing workflow (via the collaboration system UI) and avoid the need for the user to access a separate contact management UI or group management workflow in order to manage groups with which a project owner is collaborating. This keeps the user engaged in the sharing workflow, providing a more intuitive and efficient approach for the project owner to manage groups by avoiding the need to access a separate contact management UI or group management workflow.

The techniques discussed herein further provide a more efficient user interface, allowing the user to stay within the sharing workflow to manage groups rather than switching to a separate UI and workflow. For example, the user remains in the sharing workflow rather than switching to a separate group management workflow in a separate window provided by a different application than the collaboration system. By way of another example, on devices that have a small display on which the UI for only one application is displayed at a time, the user need not switch between different applications having different user interfaces in order to perform group management and collaboration project sharing.

Additionally, the techniques discussed herein conserve system resources. For example, memory usage is reduced by not needing to display the separate contact management UI. By way of another example, network bandwidth usage is reduced by not needing to access and display a UI for a remote group management system.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the ad hoc group management within a collaboration project sharing workflow described herein. The illustrated environment 100 includes a contact information system 102, a project owner computing device 104, and multiple (m) collaborator computing devices 106(1), . . . , 106(m). The contact information system 102 is implemented by one or more computing devices. Computing devices that are usable to implement the contact information system 102, the project owner computing device 104, and each of the collaborator computing devices 106 may be configured in a variety of ways. A computing device, for instance, may be configured as a desktop computer, a laptop computer, a mobile device (e.g., assuming a handheld configuration such as a tablet or mobile phone), a server device, and so forth. Thus, the computing device may range from full resource devices with substantial memory and processor resources (e.g., personal computers, game consoles) to low resource devices with limited memory and/or processing resources (e.g., mobile devices). Additionally, a computing device may be representative of a plurality of different devices, such as multiple servers utilized by a business to perform operations "over the cloud" as further described in relation to FIG. 24.

The project owner computing device 104 can communicate with the contact information system 102 and the collaborator computing devices 106 via a network 108. Such a network can be a variety of different networks, including the Internet, a local area network (LAN), a cellular or other phone network, an intranet, other public or proprietary networks, combinations thereof, and so forth.

The project owner computing device 104 includes a project collaboration system 110, and each of the collaborator computing devices 106(1), . . . , 106(m) includes a project collaboration system 112(1), . . . , 112(m), respectively. Each project collaboration system 110, 112 implements functionality to allow a project owner to create and edit a project, and optionally share the project with other users. A project as used herein refers to a collaboration effort by multiple users to work on some endeavor. Such projects can include, for example, the creation, editing, and reviewing of digital content (e.g., text, images, video, audio and so forth), video or audio conferences, and so forth. The project owner refers to the user that initially created or controls the project (e.g., the user that created a file including digital content, the user that first started creating digital content, the user that started providing audio or video content first, the user that set up (e.g., scheduled) an audio or video conference, and so forth).

Each of the project collaboration system 110 and the project collaboration systems 112 can be installed applications or online applications. For example, the project collaboration systems 110, 112 can each be applications installed on their respective computing devices. By way of another example, one or more of the project collaboration systems 110, 112 can be a web browser installed on their respective computing devices, the web browser accessing via the network 108 an online application hosted by a server.

In one or more implementations the project collaboration systems 110, 112 are each a digital content editing program that allows for the creation, editing, and reviewing of various digital content (e.g., an image or drawing editing program, an audio or video editing program). Additionally or alternatively, the project collaboration systems 110, 112 can be other types of programs, such as conferencing programs that allow for the establishment and maintaining of audio or video conferences, instant messaging programs that allow instant messages to be communicated to different users, email programs that allow email messages to be communicated to different users, and so forth.

The project collaboration system 110 includes functionality to manage groups of users within a collaboration project sharing workflow. This group management can take various forms, such as creating groups, editing groups, setting permissions, and so forth. Thus, as discussed in more detail below, a project owner using the project collaboration system 110 can create and edit groups as part of the workflow of sharing the collaboration project, alleviating the project owner of the need to use a separate user interface location or surface to access a separate contacts list or email list.

Example System Architecture

Figure 2:
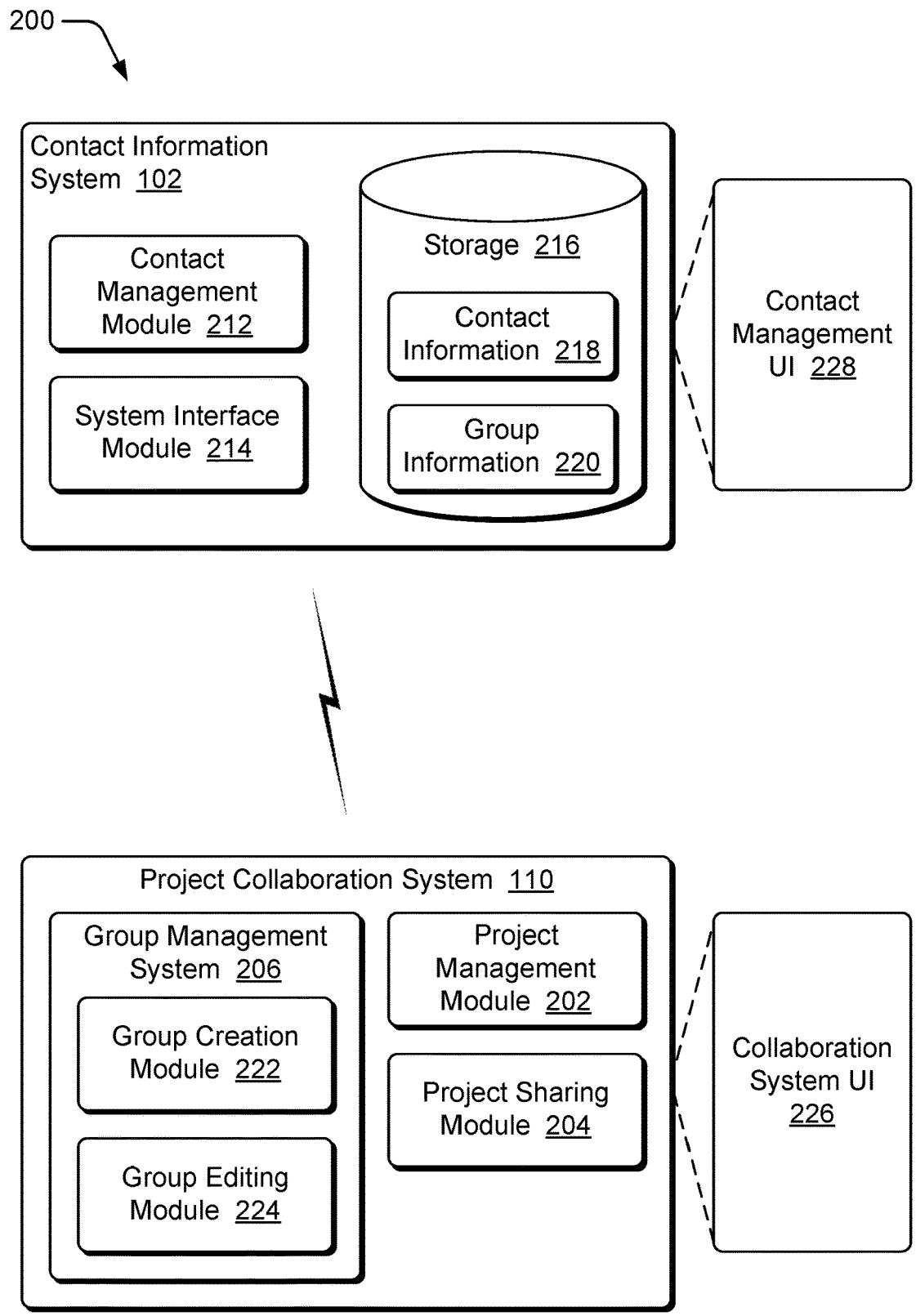
FIG. 2 is an illustration of an example implementation of a contact information system and project collaboration system.

FIG. 2 is an illustration of an example implementation 200 of a contact information system and project collaboration system. The illustrated example implementation 200 includes the contact information system 102 and the project collaboration system 110 (e.g., implemented in the project owner computing device 104 of FIG. 1).

The project collaboration system 110 includes a project management module 202, a project sharing module 204, and a group management system 206. The project management module 202 implements functionality to manage the project. This management can vary based on the type of the project. For example, the project management module 202 can implement functionality allowing users to edit digital content, such as creating the digital content, changing the digital content, and so forth. By way of another example, the project management module 202 can implement functionality allowing users to schedule an audio or video conference.

The project sharing module 204 implements functionality to cause the collaboration project to be shared with other users. The project sharing module 204 itself can share the collaboration project with other users, or can communicate with an additional module (e.g., an email program) to have that additional module send a message or other notification to share the collaboration project with other users. The project can be shared with other users in a variety of different manners. In one or more implementations, a copy of the collaboration project or a link to where the collaboration project is stored is sent to the other users. For example, if the collaboration project is digital content, then a file including the digital content or a link to where the digital content is stored can be sent to the other users. Such a file or link can be sent to the other users in various different manners, such as via email, instant messaging, and so forth.

Additionally or alternatively, an invitation to participate in the collaboration project is sent to the other users. For example, if the collaboration project is an audio conference or video conference, an invitation to be part of the audio conference or video conference is sent to the other users. Such an invitation can be sent to the other users in various different manners, such as via email, instant messaging, and so forth.

The group management system 206 implements functionality to allow ad hoc group management within the collaboration project sharing workflow. This ad hoc group management can include various management operations, such as creation of a group, editing of a group (e.g., changing members of a group, changing permissions of a group), and so forth. The group management system 206 communicates with the contact information system 102 to facilitate managing groups as discussed in more detail below.

The contact information system 102 includes a contact management module 212, a system interface module 214, and storage 216. The storage 216 can be any one or more of a variety of different types of storage, such as random access memory (RAM), Flash memory, solid state drive, magnetic disk drive, and so forth. The storage 216 maintains contact information 218 and group information 220.

The system interface module 214 is an interface allowing the project collaboration system 110 to communicate with the contact information system 102. The system interface module 214 receives requests from the project collaboration system 110 and provides those requests to the contact management module 212. The system interface module 214 also receives responses to those requests from the contact management module 212, and provides those responses to the project collaboration system 110. In one or more implementations, the system interface module 214 exposes one or more application programming interfaces (APIs) allowing the project collaboration system 110 to request contact information or group information, to store new group information, to change group information, and so forth. The communication between the project collaboration system 110 and the contact information system 102 is discussed in more detail below.

The contact management module 212 manages access to the contact information 218 and the group information 220, including storage and retrieval of the contact information 218 as well as the group information 220. The contact information 218 is information identifying different users. Various different information can be used to identify each individual user, such as an email address of the user, an instant messaging address or identifier of the user, a name of the user, a phone number of the user, a postal address of the user, and so forth.

The group information 220 is information identifying various different characteristics of groups of users. Each user included in a group is also referred to as a member of the group. Each group typically includes multiple members, although situations can arise in which a group includes a single member. The group information 220 for a particular group includes identifiers of which users are members of the group. The users that are members of the group can be identified in various manners using any of the contact information (e.g., stored as contact information 218) to identify the users. For example, the users can be identified by their email addresses, by their instant messaging addresses or identifiers, by their names, and so forth. The group information 220 can also include additional information regarding each group, such as the name of the group, permission settings for the group (e.g., whether the group is public or private, whether members of the group can edit the group information, and so forth).

The contact management module 212 responds to requests received by the contact information system 102 from the project collaboration system 110. Various different requests can be received, such as requests to search for contact information or group information, requests to alter group information, requests to create groups, and so forth. The contact management module 212 responds to the requests received from the project collaboration system 110, returning to the project collaboration system 110 the requested contact information or group information, saving altered group information or group information for newly created groups, and so forth.

The group management system 206 of the project collaboration system 110 includes a group creation module 222 and a group editing module 224. The group creation module 222 allows a project owner to create a new group while within the collaboration project sharing workflow. Being in or within the collaboration project sharing workflow refers to the UI displayed by the project collaboration system 110 that allows a collaboration project to be shared with other users. The project collaboration system 110 displays a UI, referred to herein as a collaboration system UI 226, that allows the project owner to create and share the collaboration project with other users. As part of the collaboration system UI 226, the group creation module 222 receives user requests to create new groups and also receives various information regarding those groups. Thus, rather than having to use a different application or UI to access the contact information system 102 and create a new group, the creation of the group can be done through the same UI as is used to create and share the collaboration project.

Similarly, the group editing module 224 allows a user to edit a group while in the collaboration project sharing workflow. As part of the collaboration system UI 226 displayed by the project collaboration system 110, the group editing module receives user requests to change information regarding groups (e.g., change the name of the group, add members to the group, remove members from the group, change permissions for the group, and so forth). Thus, rather than having to use a different application or UI to access the contact information system 102 and change group information, the information for the group can be changed through the same UI as is used to create and share the collaboration project.

The group creation module 222 receives user input from the project owner, via the collaboration system UI 226, identifying one or more users to include in a group. The user input identifying a user to include in a group can be made in a variety of different manners. In one or more implementations, the user input is an identifier of the user to add to the group, such as an email address of the user, an instant messaging address or identifier of the user, by the name of the user, and so forth. For example, the project owner can type in the email address of each user that is to be included in the group.

Additionally or alternatively, the group creation module 222 can leverage contact information system 102 to facilitate identifying users that the project owner desires to include in the group. In one or more implementations, the group creation module 222 displays, as part of the collaboration system UI 226, a text entry field allowing the user to input an identifier of the user. The identifier of the user can be made up of various combinations of letters, numbers, and symbols. As the project owner enters each text character to the text entry field, the group creation module 222 sends the text character(s) entered by the project owner so far to the contact information system 102. The contact management module 212 uses the received text character(s) to identify different users based on their contact information that are possible matches for the text character(s) entered by the project owner so far, and returns the identifiers of one or more of those users to the group creation module 222. For example, if the text character(s) entered by the project owner so far are "da", the group creation module 222 can identify any user identifiers in the contact information 218 that begin with "da". The group creation module 222 displays the identifiers of those users as suggested users to add to the group being created. The project owner can then select one of those suggested users (e.g., by clicking on or touching the identifier of the user).

The contact management module 212 can prioritize or order the identifiers that match the text character(s) entered by the project owner so far in a variety of different manners. In one or more implementations, the contact information system 102 maintains a contact list for the project owner, which can include a list of users specified by the project owner as being common or favorites, a list of users the project owner previously shared one or more collaboration projects with, and so forth. Identifiers of users that match the text character(s) entered by the project owner so far and are in the contact list of the project owner can be listed first for display by the group creation module 222.

In one or more implementations, the contact information 218 for users also includes, for users that are on the same enterprise or network as the project owner, an identifier that those users are on the same enterprise or network as the project owner. Identifiers of users that match the text character(s) entered by the project owner so far and are on the same enterprise or network as the project owner can be listed first for display by the group creation module 222 (or alternatively listed after the identifiers of users that match the text character(s) entered by the project owner so far and are in the contact list of the project owner).

Additionally or alternatively, the contact information 218 for users can also include, for users that work for the same company as the project owner, an identifier of a group or division of the company that the user works in. Identifiers of users that match the text character(s) entered by the project owner so far and that work for the same group or division of the company as the project owner can be listed first for display by the group creation module 222. Alternatively, identifiers of users that match the text character(s) entered by the project owner so far and that work for the same group or division of the company as the project owner can be listed after the identifiers of users that match the text character(s) entered by the project owner so far and are in the contact list of the project owner and after (or alternatively before) the identifiers of users that match the text character(s) entered by the project owner so far and are on the same enterprise or network as the project owner).

The group creation module 222 also allows the project owner to specify, via the collaboration system UI 226, a name for the group. The name of the group can be any sequence of text characters that the user desires, optionally excluding names that the project owner has already used for other groups.

In one or more implementations, the group creation module 222 also allows the user to specify, via the collaboration system UI 226, permissions for the group. Generally, permissions for the group indicate who is allowed to do what with the group. Various different permissions can be associated with the group. In one or more implementations, the permissions for the group include an indication of who can edit the group information for the group (e.g., add users to the group, remove users from the group, change permission settings for the group, and so forth). For example, one permission setting may be that only the project owner can edit the group information and another permission setting may be that any member of the group can edit the group information.

Additionally or alternatively, the permissions for the group can indicate whether the group is private, semi-public, or public. A group that is private is accessible only to the project owner. In such situations, the contact management module 212 can store the group information 220 for the group as associated with the project owner, and any requests to use, edit, or otherwise access the group information for the group by users other than the project owner are denied. A group that is semi-public is accessible only to the project owner and members of the group. In such situations, the contact management module 212 denies any requests to use, edit, or otherwise access the group information for the group by users other than the project owner or members of the group are denied. For example, as discussed in more detail below, the contact information system 102 can be leveraged to facilitate identifying groups that the project owner desires to share the collaboration project with, and the contact information system 102 returns to the project collaboration system 110 for a project owner only identifiers of groups that are public as well as groups that are both private and associated with the project owner. A group that is public is accessible to everyone that accesses the contact information system 102. In such situations, the contact management module 212 carries out and responds to any requests to use, edit, or otherwise access the group information for the group.

The group creation module 222 also receives user input, via the collaboration system UI 226, indicating when the project owner has completed adding members to the group and optionally assigning any desired permissions to the group. This user input can be any of a variety of different user inputs, such as selection of a "create" button or menu option. In response to this user input, the group creation module 222 communicates with the contact information system 102 to store the newly created group. This communication includes sending the information specified by the project owner during creation of the group, such as identifiers of users in the group, the group name, permissions for the group, and so forth. The contact management module 212 stores this information received from the group creation module 222 as group information 220 for the group.

The group editing module 224 receives user input, via the collaboration system UI 226, from the project owner for a group, or alternatively another user with permission to edit the group information for the group, identifying changes to make to the group information. The group editing module 224 can allow various different changes to the group information, such as altering the membership of the group (e.g., adding users to or removing users from the group), altering the permissions of the group, and so forth. In response to a user request to edit the group information for a group, the contact management module 212 verifies that, given the permissions for the group, the user is allowed to edit the group. If the permissions indicate that the user is not allowed to edit the group then the request is denied by contact management module 212. The contact management module 212 returns none of the group information for the group, and optionally doesn't even acknowledge that the group exists.

However, if the permissions indicate that the user is allowed to edit the group then the contact management module 212 returns the group information for the group to the group editing module 224. The group editing module 224 displays the group information for the group and receives user input changing the group. The user input changing the group can include identification of a user to add to the group. The user to be added to the group can be specified in a variety of different manners analogous to the discussion above regarding creating a group, such as by inputting an identifier of the user to add to the group, by leveraging contact information system 102 to facilitate identifying users that the project owner desires to include in the group and displaying the identifiers of suggested users to add to the group, and so forth.

The user input changing the group can also include identification of a user to remove from the group. The user to be removed from the group can be specified in a variety of different manners, such as by touching or clicking on an identifier of the user to be removed, touching or clicking on a radio button associated with the identifier of the user to be removed, and so forth.

The user input changing the group can also include identification of a change to the name of the group. The group editing module 224 can receive text characters and an indication that the group name is to be changed to the text characters. This indication that the group name is to be changed can be made in a variety of different manners, such as by the user entering the text characters as overwriting or replacing the current group name, by entering the text characters in a text input field and selecting an "update name" button or menu option, and so forth.

The user input changing the group can also include identification of a change to permission for the group. Various different permissions can be associated with the group as discussed above. Analogous to the discussion above regarding creation of the group, the user can input an indication of who can edit group information for the group, an indication of whether the group is private, semi-public, or public, and so forth.

The group editing module 224 also receives user input, via the collaboration system UI 226, indicating when the user has completed changing the group. This user input can be any of a variety of different user inputs, such as selection of a "done" button or menu option. In response to this user input, the group editing module 224 communicates with the contact information system 102 to store the changed group. This communication includes sending the information specified by the project owner during editing of the group, such as identifiers of users added to or removed from the group, the new group name, the new permissions for the group, and so forth. The contact management module 212 stores this information received from the group editing module 224 as group information 220 for the group.

In one or more implementations, the permissions for a group are set by default (e.g., by the group creation module 222 during creation of the group) and are not selectable by the project owner when creating the group and are not changeable by a user via the group editing module 224. However, the user can access the contact information system 102 directly (e.g., via a web browser as discussed above) and provide input to the contact information system 102 to change the permissions.

For example, the permissions for a group created within the collaboration project sharing workflow can be set by default to indicate that the group is private. If the user desires to change the permissions (e.g., to public or semi-public) the user can access the contact information system 102 directly to change the permissions.

In one or more implementations, the contact management module 212 also provides a UI, also referred to as a contact management UI 228. The contact management UI 228 allows users to access the contact management module 212 via a different program (e.g., a web browser) rather than the project collaboration system 110. The contact management UI 228 is different from the collaboration system UI 226 because the contact management UI 228 is not displayed as part of a collaboration project sharing workflow. The contact management UI 228 allows users to create and change contact information 218 as well as group information 220 separately from using the project collaboration system 110.

In one or more implementations, the group information 220 for a particular group is associated with the project owner that created that particular group. This association can be maintained in a variety of different manners, such as associating an identifier of the project owner (e g, name, email address, instant messaging identifier, credentials (e.g., user name and password)) with the group information. Accordingly, in response to the project owner identifying himself or herself (e.g., by providing credentials) to either the project collaboration system 110 or the contact management module 212, the project owner has access to the group information for the groups he or she has created.

Figure 3:
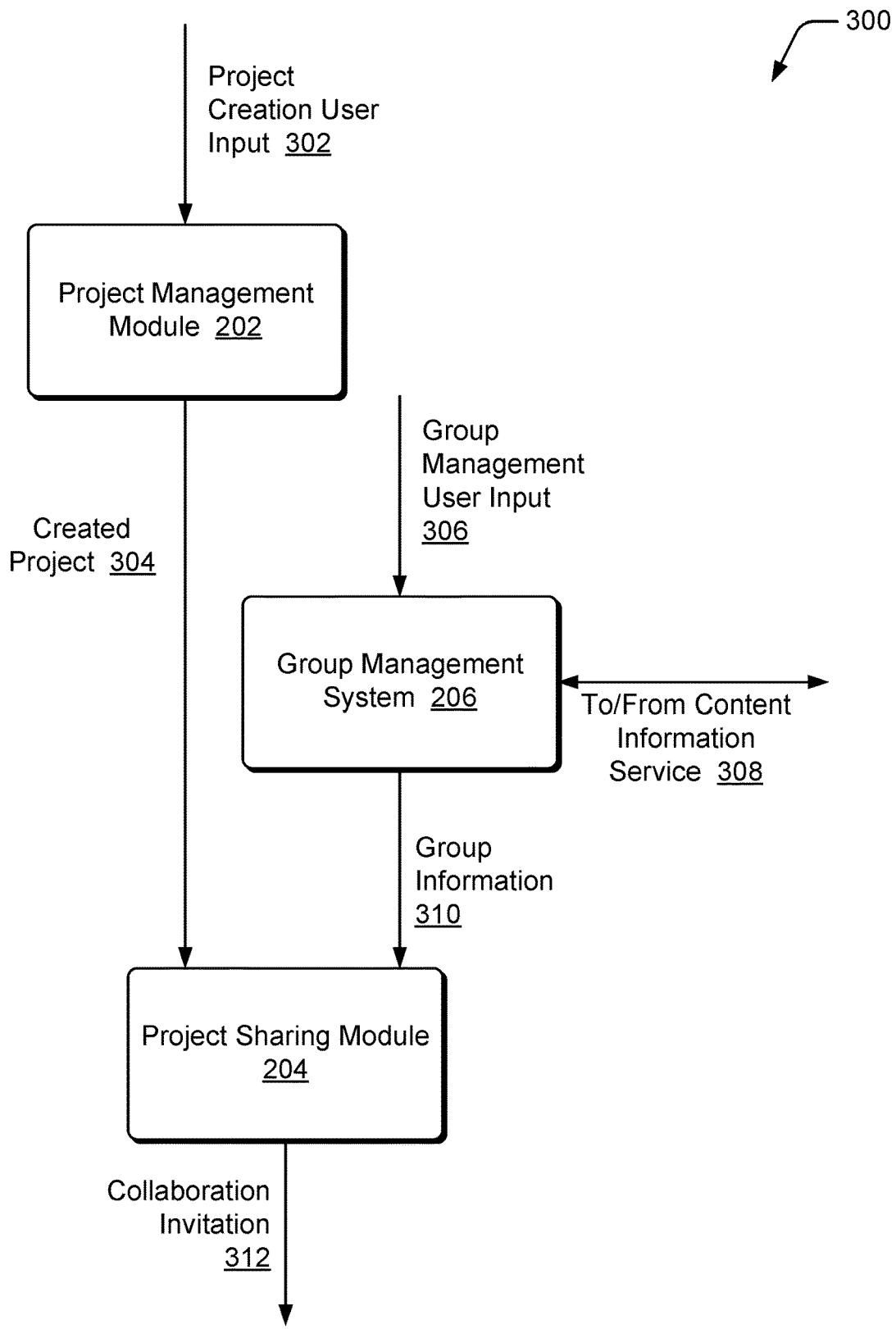
FIG. 3 is an illustration of an example collaboration project sharing workflow.

FIG. 3 is an illustration of an example collaboration project sharing workflow 300. In the example collaboration project sharing workflow 300, the project management module 202 receives project creation user input 302. The project creation user input 302 is various different user inputs identifying and changing the collaboration project, such as digital content. The project management module 202 displays the collaboration project including changes made during creation and editing of the collaboration project through a collaboration system UI. The project management module 202 also outputs the created project 304 to the project sharing module 204.

Additionally, the group management system 206 receives group management user input 306. The group management user input 306 is various different user inputs to create or edit a group as discussed above. The group management system 206 communicates 308 with a contact information system (e.g., the contact information system 102) as discussed above, such as to receive suggested users to add to the group, to save the group, and so forth. The group management system 206 displays the group information for the group as well as options to create or change the group through the collaboration system UI. The group management system 206 also outputs the group information 310 for the newly created or edited group to the project sharing module 204.

The project sharing module 204 receives the created project 304 and the group information 310, and causes a collaboration invitation 312 to be sent to each member of the group (as indicated by the group information 310) to access the created project 304. The collaboration invitation 312 can be sent to members of the group in different manners based on the group information 310, such as by sending an invitation to an email address, to an instant messaging name or identifier, and so forth. The collaboration invitation 312 can be sent by the project sharing module 204 itself, or the project sharing module 204 can communicate with another module or program (e.g., an email program, an instant messaging program) to send the collaboration invitation 312.

The collaboration invitation 312 can take any of a variety of different forms. In one or more implementations, the collaboration invitation 312 includes a link to a location (e.g., on a storage device of the project owner computing device 104, on a server accessible via the network 108) where the project management module 302 stores the created project 304. Additionally or alternatively, the collaboration invitation 312 includes the created project 304 (e.g., the digital content created by the project owner). Additionally or alternatively, the collaboration invitation 312 includes a notification that the created project 304 has been created or edited and relies on the recipients of the collaboration invitation 312 to know where the project management module 202 stores the crated project 304.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Example Collaboration System UI

Figure 4:
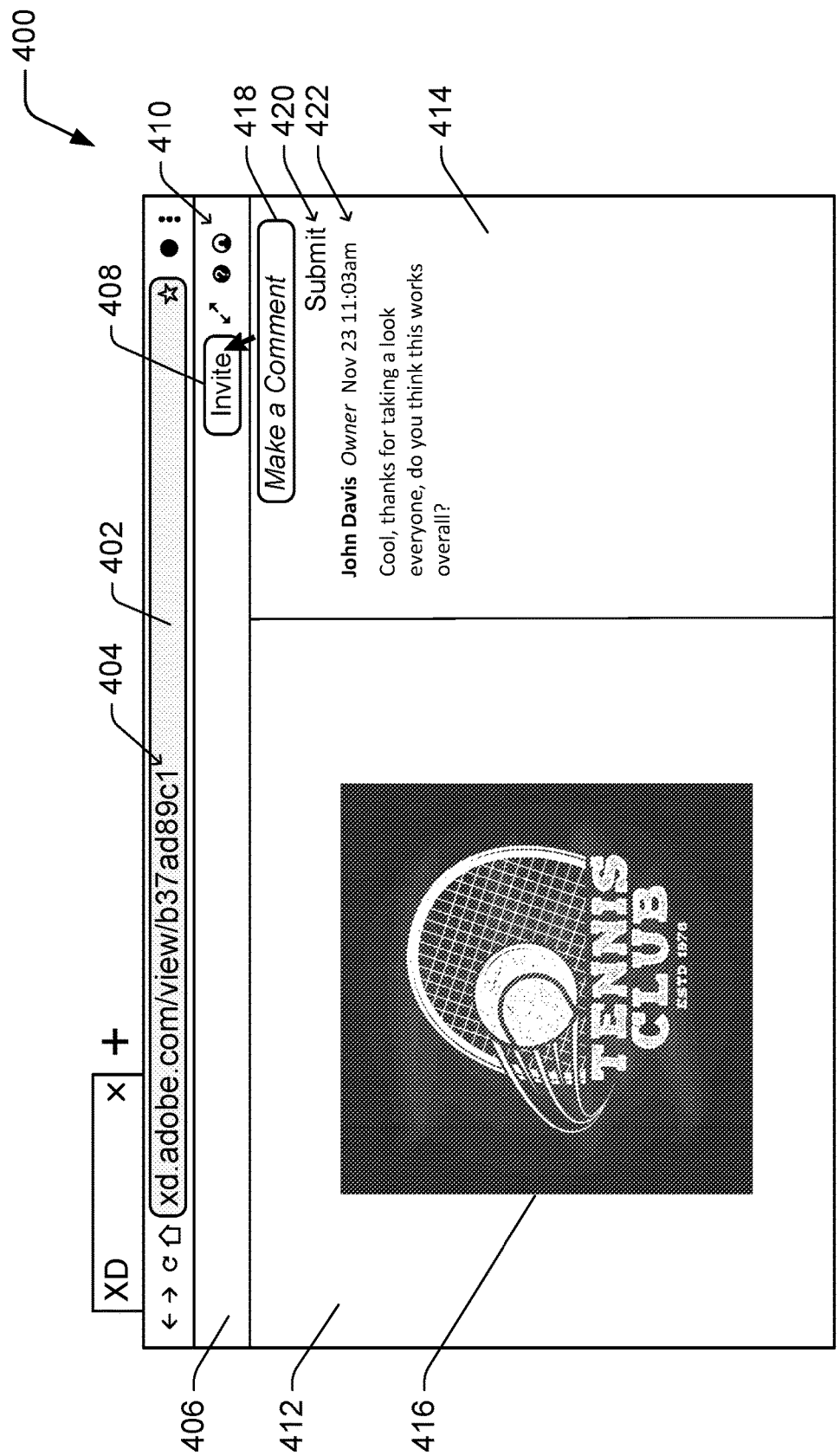
FIGS. 4, 5, 6, 7, 8, 9, 10, 11, and 12 illustrate example views of ad hoc group management within a collaboration project sharing workflow.

FIGS. 4-12 illustrate an example of ad hoc group management within a collaboration project sharing workflow. The views illustrated in FIGS. 4-12 can be displayed in various manners, such as by a standalone application, inside a web browser, and so forth. FIG. 4 illustrates a view 400 of an example collaboration system UI for a project collaboration system, such as project collaboration system 110. The view 400 of the collaboration system UI includes an address bar portion 402 in which a name 404 (e.g., a uniform resource locator (URL)) of the collaboration project is displayed, illustrated as "xd.adobe.com/view/b37ad89c1". An application bar portion 406 includes a sharing button 408, illustrated as a button labeled "invite", and optionally control icons 410. Control icons allow the user to control aspects of the collaboration system UI, such as arrow icons that can be selected to make the UI full-screen, a question mark icon that can be selected to receive help, and a person icon that can be selected to change a status of a user.

The view 400 of the collaboration system UI also includes a project portion 412 and a comments portion 414. In one or more implementations, the project portion 412 allows the project owner to create and edit a collaboration project. Additionally or alternatively, the project portion 412 displays the collaboration project and is read-only (e.g., not allowing editing of the collaboration project). In the illustrated example of FIG. 4, the collaboration project is digital content 416, illustrated as a logo for a tennis club. The creation and editing of the collaboration project can be performed with various different UI elements, such as buttons, icons, menu options, and so forth that allow the collaboration project to be created and modified.

The comments portion 414 allows the project owner as well as other users with which the collaboration project is shared to enter comments. The comments portion includes a comment initiation text entry field 418, illustrated with the text "Make a Comment", into which the project owner can enter a comment (the text "Make a Comment" disappears when the project owner begins typing or otherwise entering the comment). Once the project owner has completed inputting the desired comment, a submit link 420 is selected by the user and the project owner's comment is stored and displayed as comment 422. In one or more implementations, when the collaboration project is shared with other users, the project owner's comments are also shared. For example, when the collaboration project is shared with other users, a link to a location where the collaboration project and the comments are stored is sent to the other users. The other users can then select the link and view the collaboration project, as well as enter their own comments (e.g., via a comment initiation text entry field and a submit link).

Figure 5:
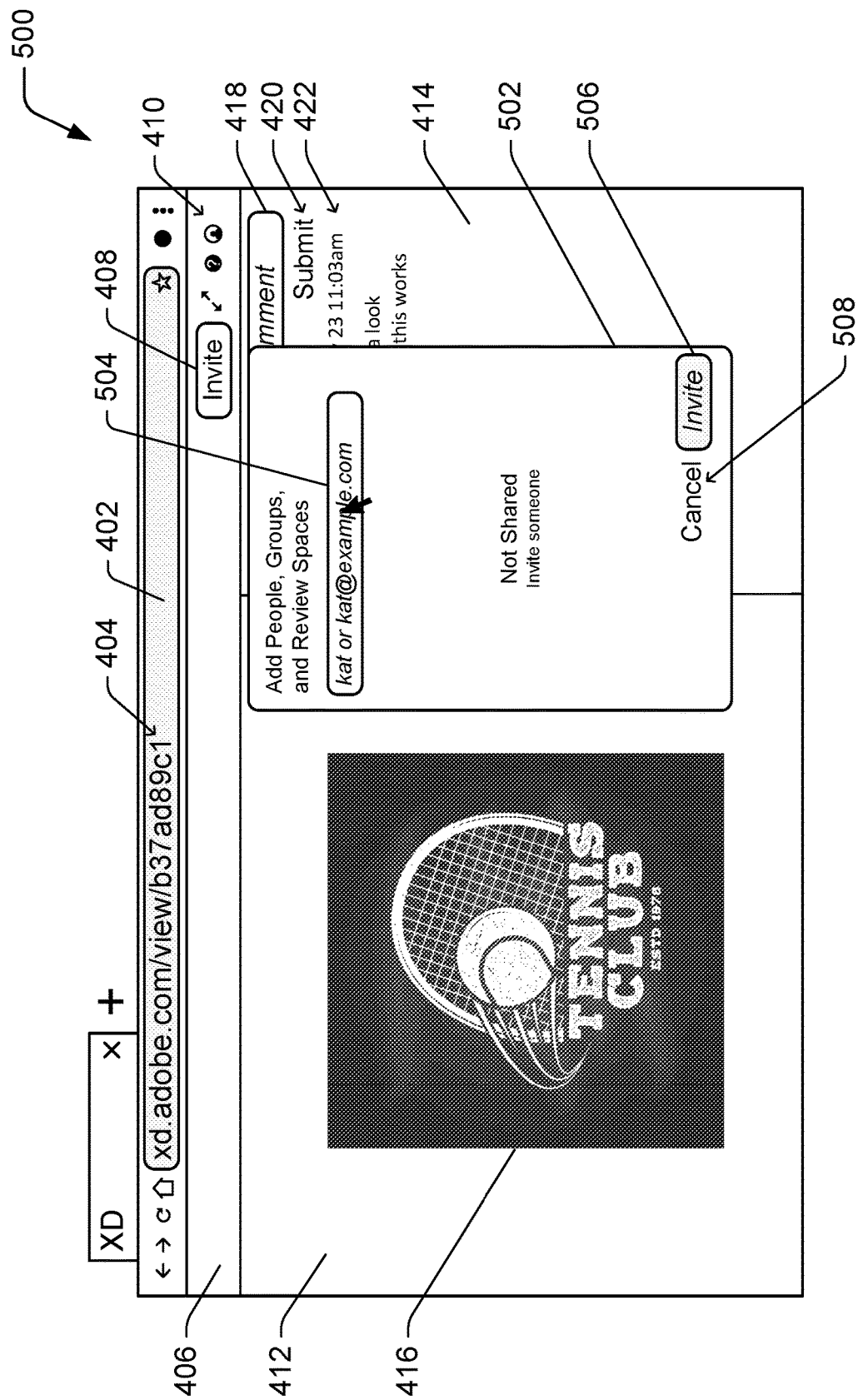

FIG. 5 illustrates another view 500 of the example collaboration system UI. The view 500 is a view of the collaboration system UI displayed in response to the project owner selecting the sharing button 408 (e.g., by the user touching or clicking on the sharing button 408) in view 400 of FIG. 4. The view 500 of the collaboration system UI includes the address bar portion 402 in which the name 404 of the collaboration project is displayed, and the application bar portion 406 in which the sharing button 408 and optionally the control icons 410 are displayed. The view 500 of the collaboration system UI also includes the project portion 412 and the comments portion 414. The comments portion 414 includes the comment initiation text entry field 418, the submit link 420, and the comment 422.

The view 500 of the collaboration system UI also includes a dialog box 502. The dialog box 502 prompts the user to add people, groups, and review spaces with which to share the collaboration project. The dialog box 502 includes a text entry field 504 into which the project owner can enter an identifier (e.g., name, email address, instant messaging address or identifier, group identifier) of a user or group of users with which to share the collaboration project. The letters "kat" and "kat@example.com" are displayed in the text entry field 504 as examples of identifiers that can be entered. The project collaboration system 110 can optionally leverage contact information system 102 to facilitate identifying users or groups that the project owner desires to share the collaboration project with. As the project owner enters each text character to the text entry field 504, the project collaboration system 110 sends the text character(s) entered by the project owner so far to the contact information system 102, which returns the identifiers of one or more users or groups that are possible matches for the text character(s) entered by the project owner so far (analogous to the discussion above regarding leveraging the contact information system 102 to identify users to add to a group).

The dialog box 502 also includes an invite button 506, illustrated as a button labeled "Invite", that is selected by the project owner to send an invitation to other users to access the collaboration project. The invite button 506 is shown shadowed out and the word "Invite" is in italics to indicate that the invite button 506 cannot be selected in the view 500. The dialog box 502 also includes a cancel option 508 that is selected by the project owner to close the dialog box 502 without sending an invitation to other users to access the collaboration project.

Figure 6:
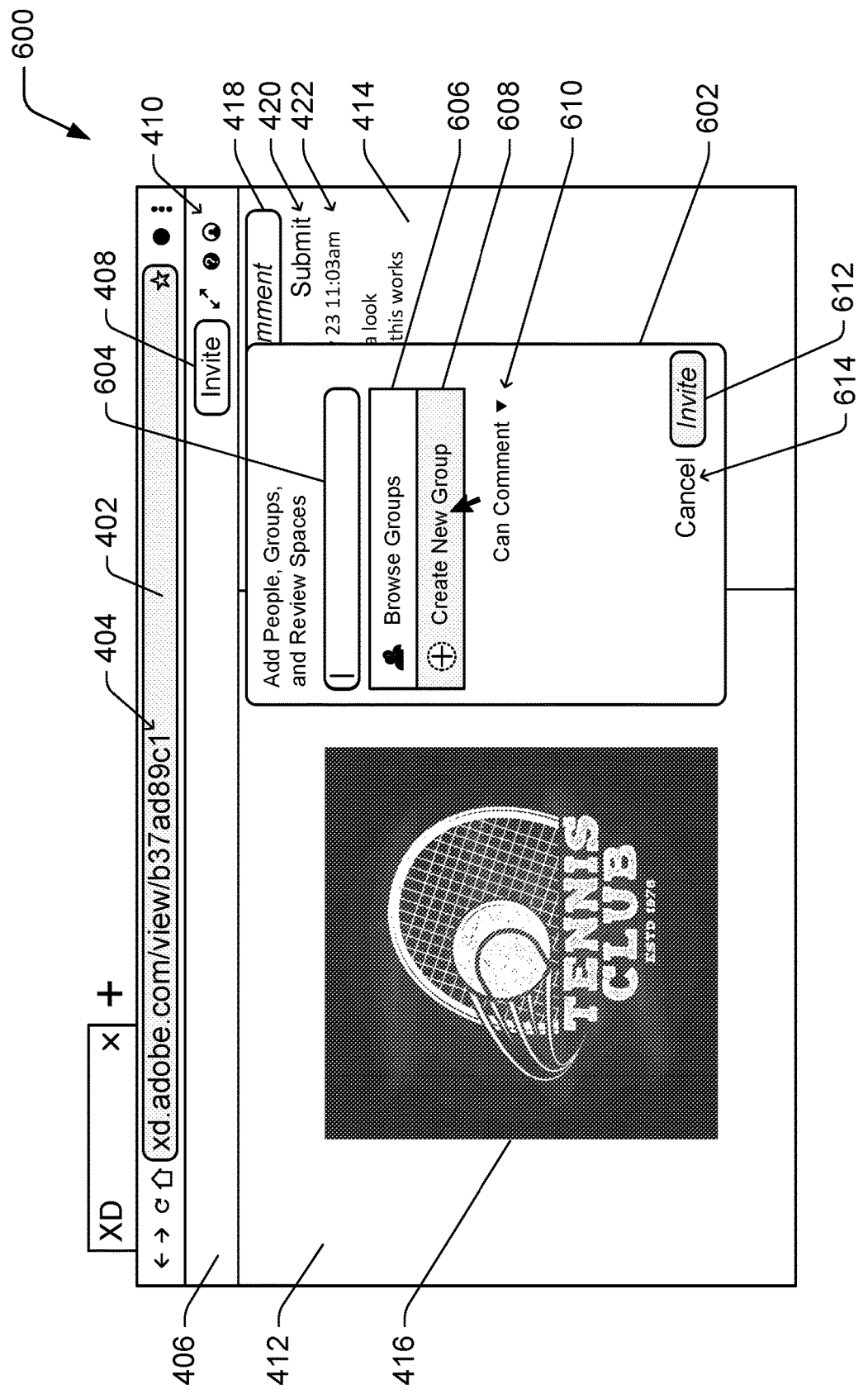

FIG. 6 illustrates another view 600 of the example collaboration system UI. In one or more implementations, the view 600 is a view of the collaboration system UI displayed in response to the project owner selecting an option to manage groups from the view 500 of FIG. 5. For example, the word "Groups" in the dialog box 502 can be a user-selectable button or link that the project owner selects when he or she desires to manage groups. Additionally or alternatively, the view 600 is a view of the collaboration system UI displayed in response to the project owner selecting the sharing button 408 (e.g., by the user touching or clicking on the sharing button 408) in the view 400 of FIG. 4. In such situations, the view 500 of the collaboration system UI need not be displayed.

The view 600 of the collaboration system UI includes the application bar portion 402 in which the name 404 of the collaboration project is displayed, and the application bar portion 406 in which the sharing button 408 and optionally the control icons 410 are displayed. The view 600 of the collaboration system UI also includes the project portion 412 and the comments portion 414. The comments portion 414 includes the comment initiation text entry field 418, the submit link 420, and the comment 422.

The view 600 of the collaboration system UI also includes a dialog box 602. The dialog box 602 prompts the user to add people, groups, and review spaces with which to share the collaboration project. The dialog box 602 includes a text entry field 604 into which the project owner can enter an identifier (e.g., email address, instant messaging address or identifier, group identifier) of a user or group of users with which to share the collaboration project.

The dialog box also includes a group editing option 606 (illustrated as a browse groups button) and a group creation option 608 (illustrated as a create new group button), both of which can be selected by the project owner (e.g., by touching or clicking on the option 606, 608). The group editing option 606 can be selected to edit a previously created group, as discussed in more detail below. The group creation option 608 can be selected to create a new group of users.

The dialog box 602 also includes a comment control option 610, illustrated as text "Can Comment" with an adjacent down arrow. The comment control option 610 can be selected by the project owner to select whether users with which the collaboration project is shared are allowed to enter comments (e.g., in the same manner as comment 422). For example, in response to selection of the comment control option 610, the view 600 can be updated to show a "Can Comment" option and a "Cannot Comment" option, and the project owner can select which of those two options he or she desires for the collaboration project.

The dialog box 602 also includes an invite button 612, illustrated as a button labeled "Invite", that is selected by the project owner to send an invitation to other users to access the collaboration project. The invite button 612 is shown shadowed out and the word "Invite" is in italics to indicate that the invite button 612 cannot be selected in the view 600. The dialog box 602 also includes a cancel option 614 that is selected by the project owner to close the dialog box 602 without sending an invitation to other users to access the collaboration project.

Figure 7:
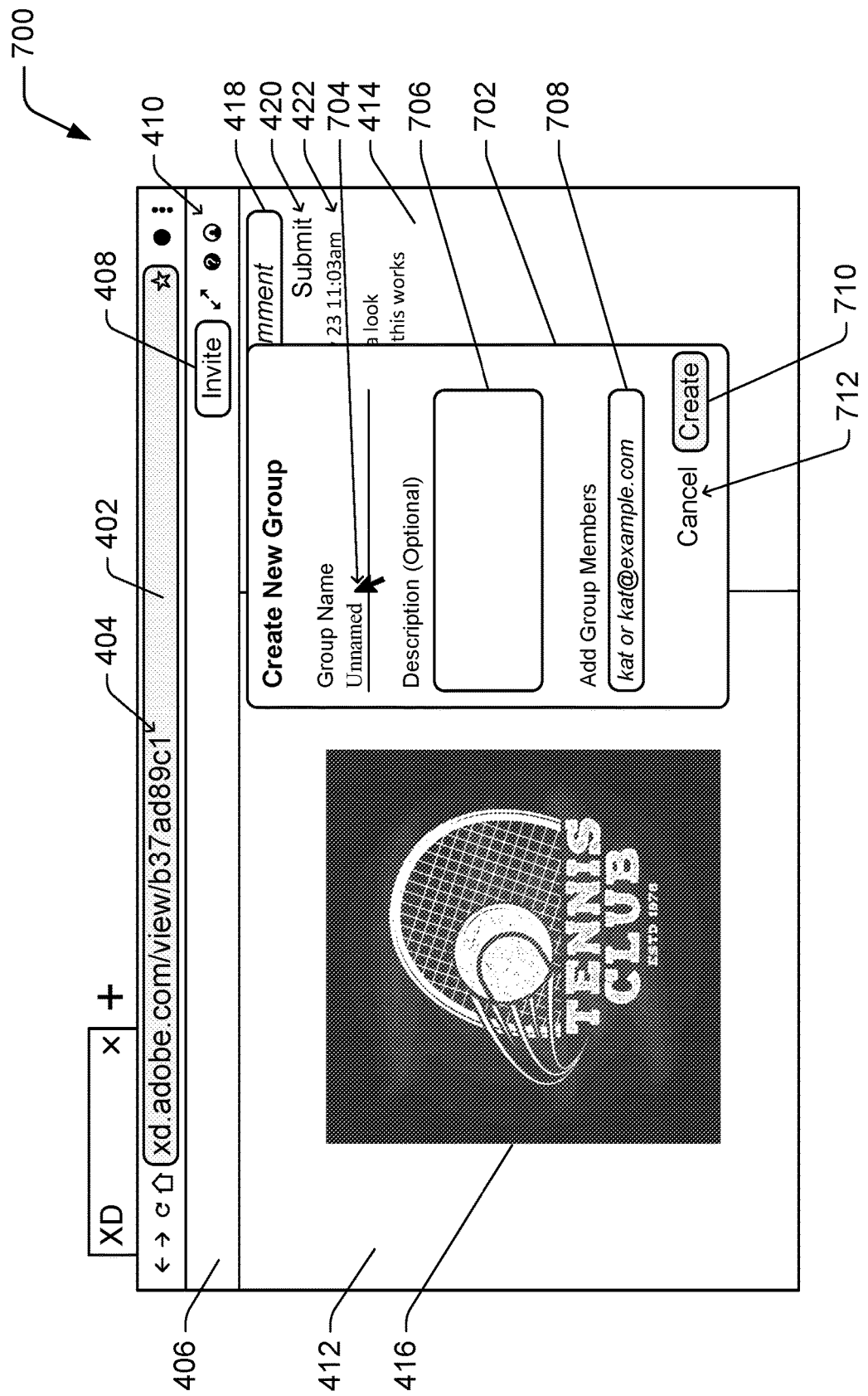

FIG. 7 illustrates another view 700 of the example collaboration system UI. The view 700 is a view of the collaboration system UI displayed in response to the project owner selecting the create new group option 608 (e.g., by the user touching or clicking on the create new group option 608) in view 600 of FIG. 6.

The view 700 of the collaboration system UI includes the application bar portion 402 in which the name 404 of the collaboration project is displayed, and the application bar portion 406 in which the sharing button 408, and optionally the control icons 410 are displayed. The view 700 of the collaboration system UI also includes the project portion 412 and the comments portion 414. The comments portion 414 includes the comment initiation text entry field 418, the submit link 420, and the comment 422.

The view 700 of the collaboration system UI also includes a dialog box 702 that prompts the project owner to create a new group of users. The dialog box 702 includes a text entry field 704 into which the project owner can enter a name of the group. In the view 700, the project owner has not yet entered a name so the text entry field 704 lists a name of "Unnamed". The dialog box 702 also includes a text entry field 706 in which the project owner can enter a description of the group being created. The project owner can enter any text characters he or she desires as the description of the group being created.

The dialog box also includes a text entry field 708 into which the project owner can enter an identifier (e.g., email address, instant messaging address or identifier) of a user to include in the group being created. The letters "kat" and "kat@example.com" are displayed in the text entry field 708 as example of identifiers that can be entered. In one or more implementations, the project owner enters a particular identifier (e.g., an email address as illustrated). Additionally or alternatively, the project owner can select from a list of identifiers suggested by the contact information system 102 based on text characters entered into the text entry field 708 as discussed above.

The dialog box 702 also includes a create button 710, illustrated as a button labeled "Create", that is selected by the project owner to create a new group once he or she has identified (e.g., typed in or selected) the users to include in the group. The dialog box 702 also includes a cancel option 712 that is selected by the project owner to close the dialog box 702 without creating a new group.

Figure 8:
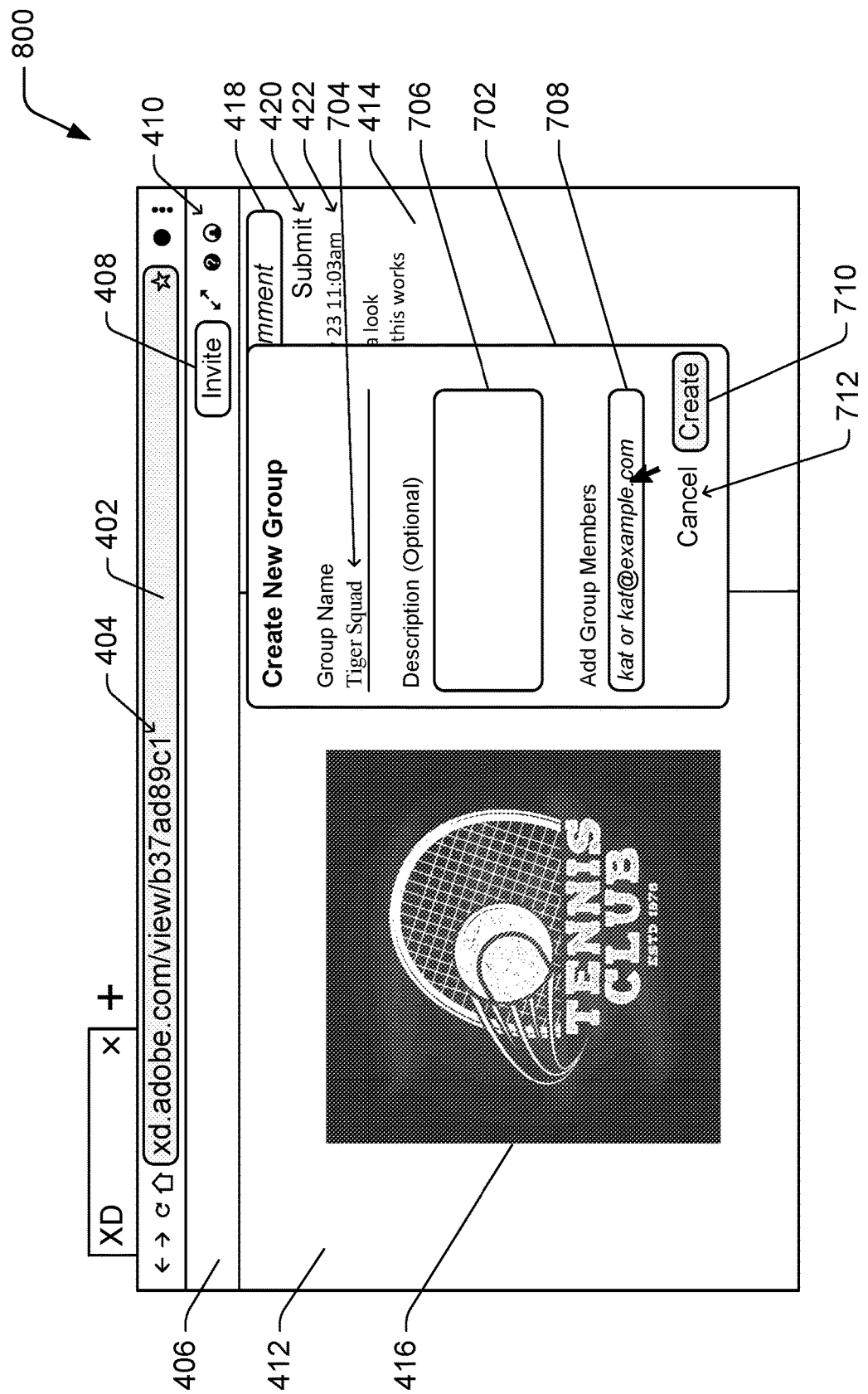

FIG. 8 illustrates another view 800 of the example collaboration system UI. The view 800 is a view of the collaboration system UI displayed in response to the project owner entering a name of a new group in the text entry field 704 in view 700 of FIG. 7. In the view 800, the project owner has entered a name of "Tiger Squad" in the text entry field 704. The view 800 is analogous to the view 700 of FIG. 7, except that the project owner has entered a name of the new group in the text entry field 704.

Although not illustrated in FIG. 8, it should be noted that additional information regarding the new group can also be provided by the project owner and displayed in the view 800. For example, an image representing the group (e.g., a picture of a tiger) can be selected by the user and displayed adjacent to (e.g., in a circle to the left of) the text entry field 704. This image is subsequently saved as part of the group information for the new group.

Figure 9:
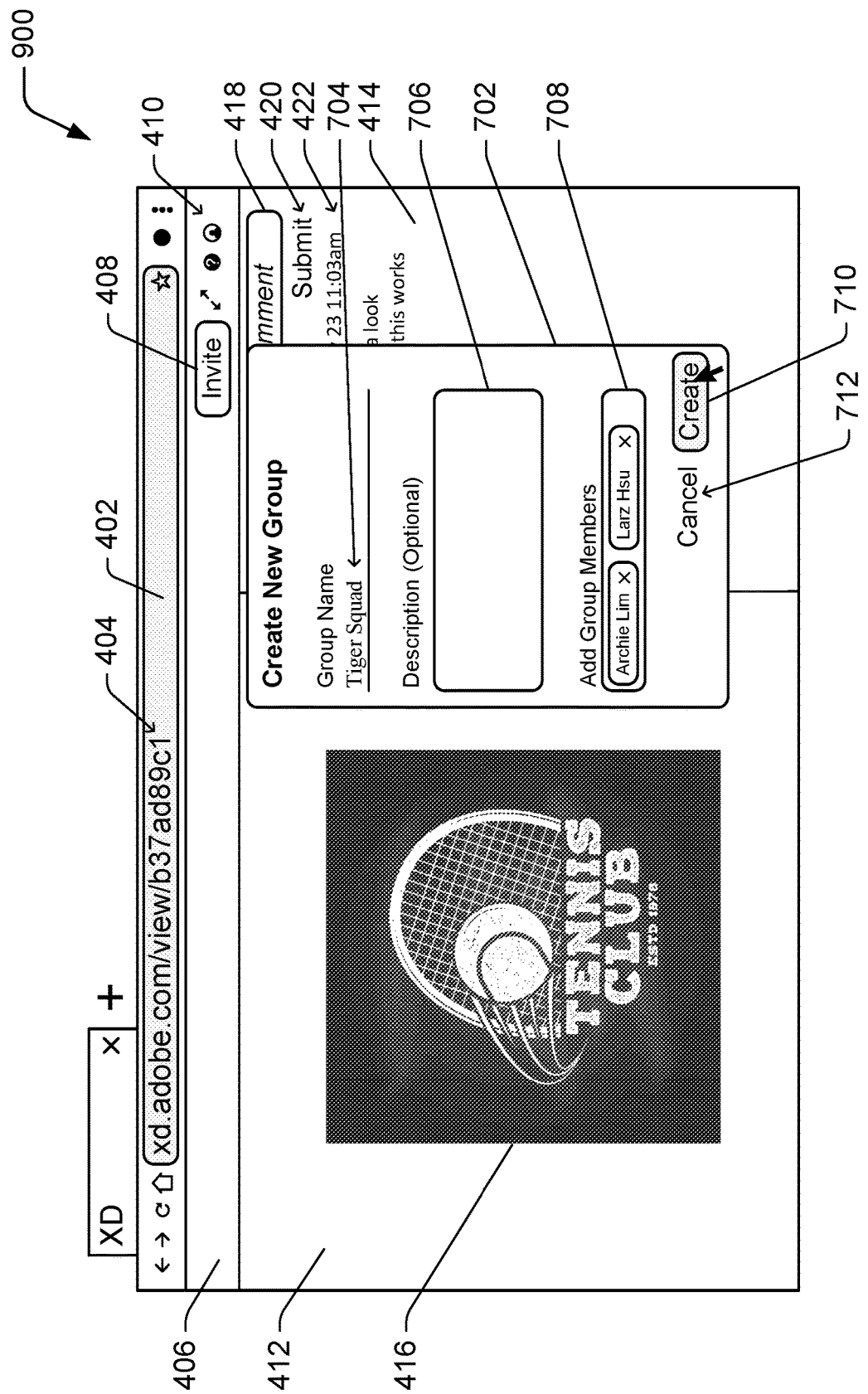

FIG. 9 illustrates another view 900 of the example collaboration system UI. The view 900 is a view of the collaboration system UI displayed in response to the project owner selecting two users to include in the new group. In the view 900, the project owner has selected users named "Archie Lim" and "Larz Hsu" to be members of the new group being created named "Tiger Squad". The names of these users are displayed in the text entry field 708. Additionally, a "x" symbol is displayed adjacent to each of the users. Selection of the "x" symbol adjacent to a user causes the group creation module 222 to remove that user from the group. Although not illustrated, the group creation module 222 maintains or has access to contact information (e.g., email address, instant messaging address or identifier) for each of the users added to the new group being created. The view 900 is analogous to the view 800 of FIG. 8, except that the project owner has selected members to include in the new group in the text entry field 708.

Figure 10:
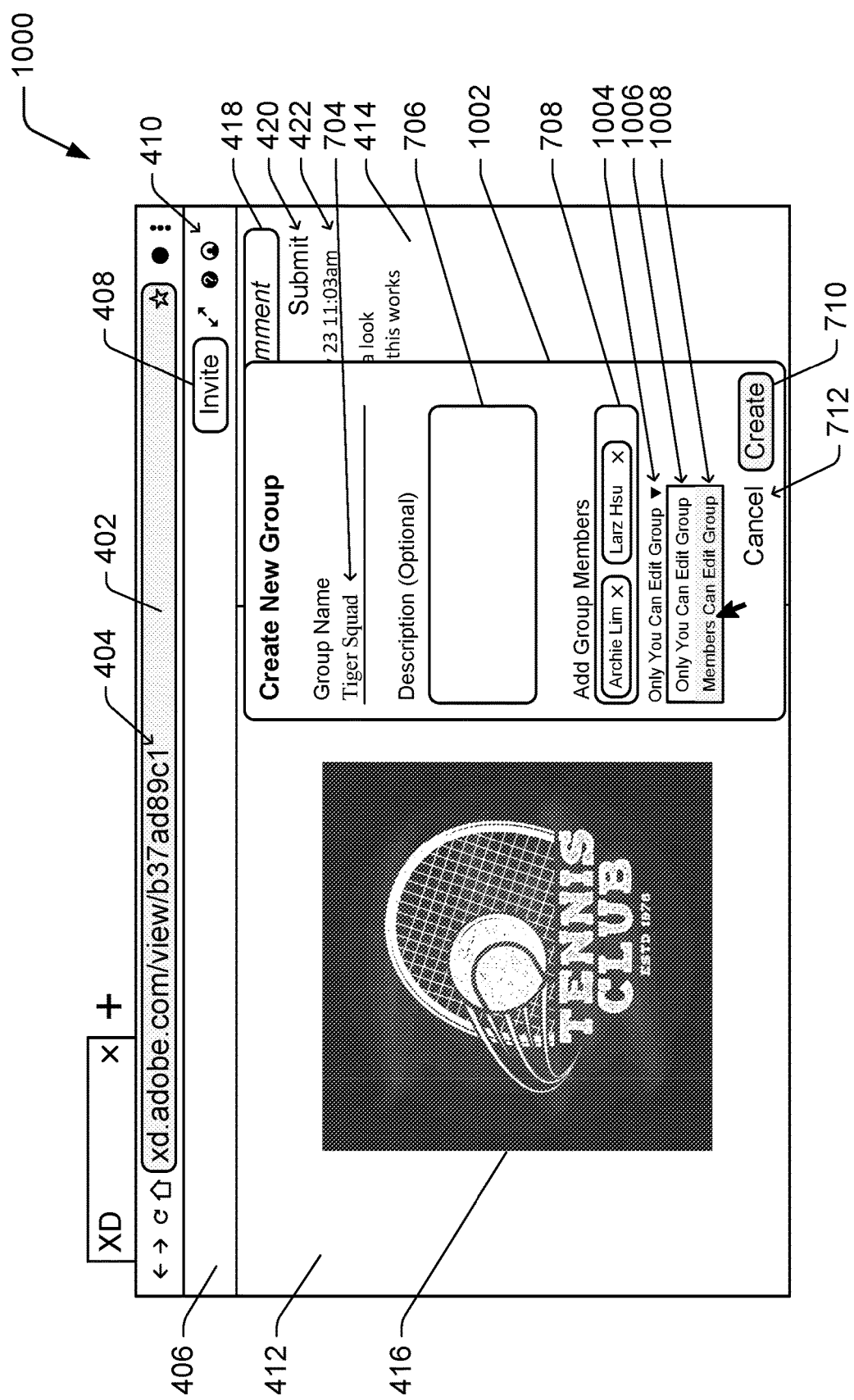

FIG. 10 illustrates another view 1000 of the example collaboration system UI. The view 1000 includes a dialog box 1002, and is a view of the collaboration system UI displayed in response to the project owner selecting two users to include in the new group, followed by the project owner selecting an edit permissions option 1004 (e.g., by the user touching or clicking on the down arrow adjacent to the "Only You Can Edit Group" text). The view 1000 is similar to the view 900 of FIG. 9, except that the project owner is presented with the option to select a permission setting for the group.

In the view 1000, the name of the group being created is displayed in the text entry field 704, and the text entry field 706 allows the project owner to add a description for the group. The names of the users selected to be members of the new group being created are displayed in the text entry field 708. The dialog box 1002 also includes a create button 710 that is selected by the project owner to create the new group, and a cancel option 712 that is selected by the project owner to close the dialog box 1002 without saving creating the group.

The project owner can select the edit permissions option 1004, causing two options to be displayed, an "Only You Can Edit Group" option 1006 and a "Members Can Edit Group" option 1008. As the project owner moves a cursor over different options, the option that the cursor is over at any given time is highlighted. In the illustrated example, the cursor is over the "Members Can Edit Group" option 1008. In response to the project owner selecting the "Only You Can Edit Group" option 1006 (e.g., by touching or clicking on the "Only You Can Edit Group" option 1006), only the project owner is able to edit the group. An indication that only the project owner is able to edit the group is stored as part of the information identifying the group. In response to the project owner selecting the "Members Can Edit Group" option 1008 (e.g., by touching or clicking on the "Members Can Edit Group" option 1008), then the project owner as well as any other member of the group is able to edit the group. An indication that the project owner as well as any other member of the group is able to edit the group is stored as part of the information identifying the group.

Figure 11:
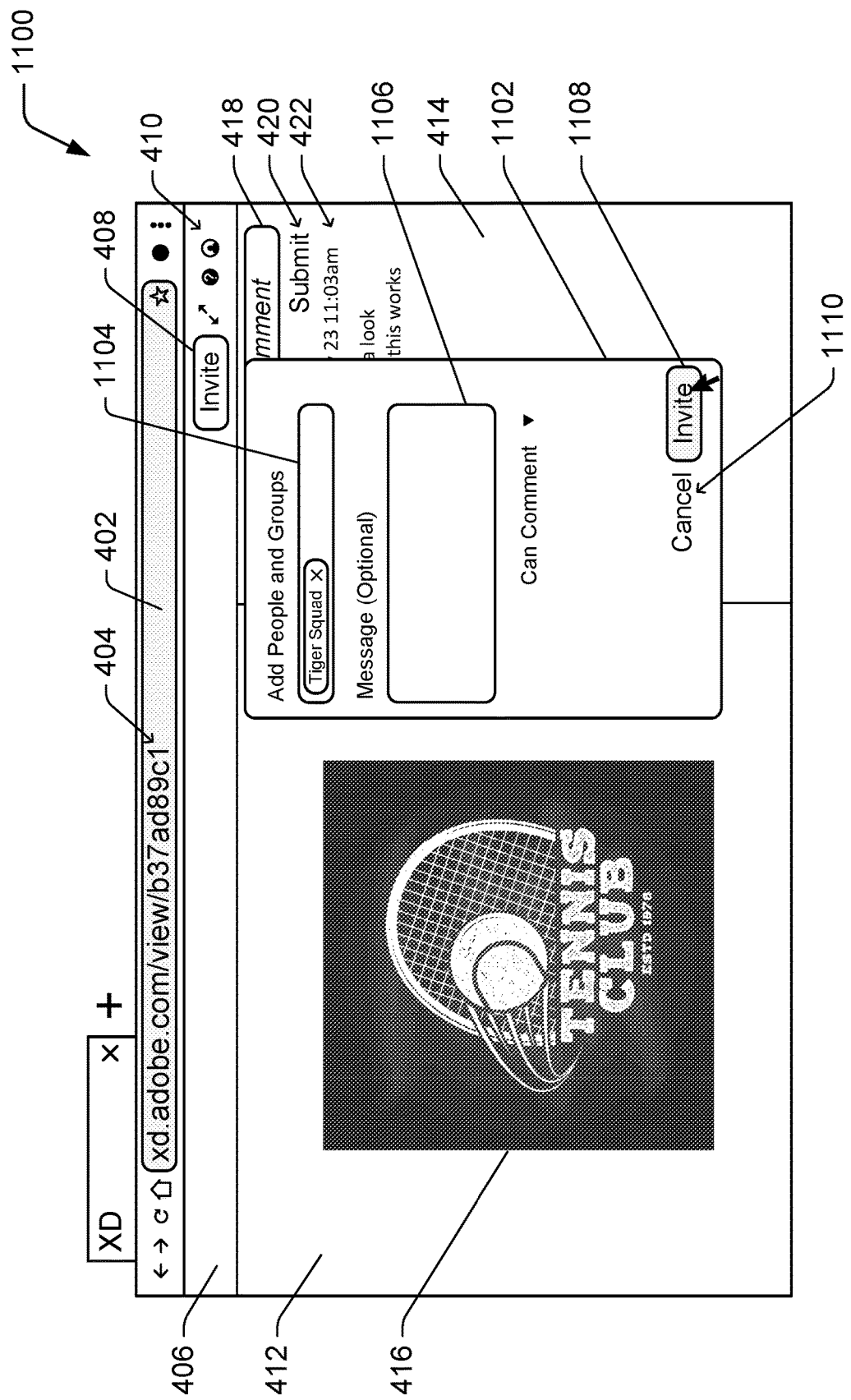

FIG. 11 illustrates another view 1100 of the example collaboration system UI. The view 1100 is a view of the collaboration system UI displayed in response to the project owner selecting the create button 710 (e.g., by the user touching or clicking on the create button 710) in view 900 of FIG. 9. The view 1100 includes a dialog box 1102. In the view 1100, the project owner has created the new group named "Tiger Squad", which includes as members the users named "Archie Lim" and "Larz Hsu" as discussed above. The name of this group is displayed in the text entry field 1104. Additionally, a "x" symbol is displayed adjacent to the group name Selection of the "x" symbol adjacent to the group name causes the group creation module 222 to remove that group from the invitees to access the collaboration project.

The dialog box 1104 also includes a message text entry field 1106 that allows the project owner to include a message to be included with an invitation to access the collaboration project. This message is optional, and can include any information the project owner desires. The dialog box 1104 also includes an invite button 1108, illustrated as a button labeled "Invite", that is selected by the project owner to send an invitation to access the collaboration project to one or more individual users, one or more groups, or a combination thereof indicated in the text entry field 1104. The dialog box 1102 also includes a cancel option 1110 that is selected by the project owner to close the dialog box 1102 without sending an invitation to access the collaboration project.

Figure 12:
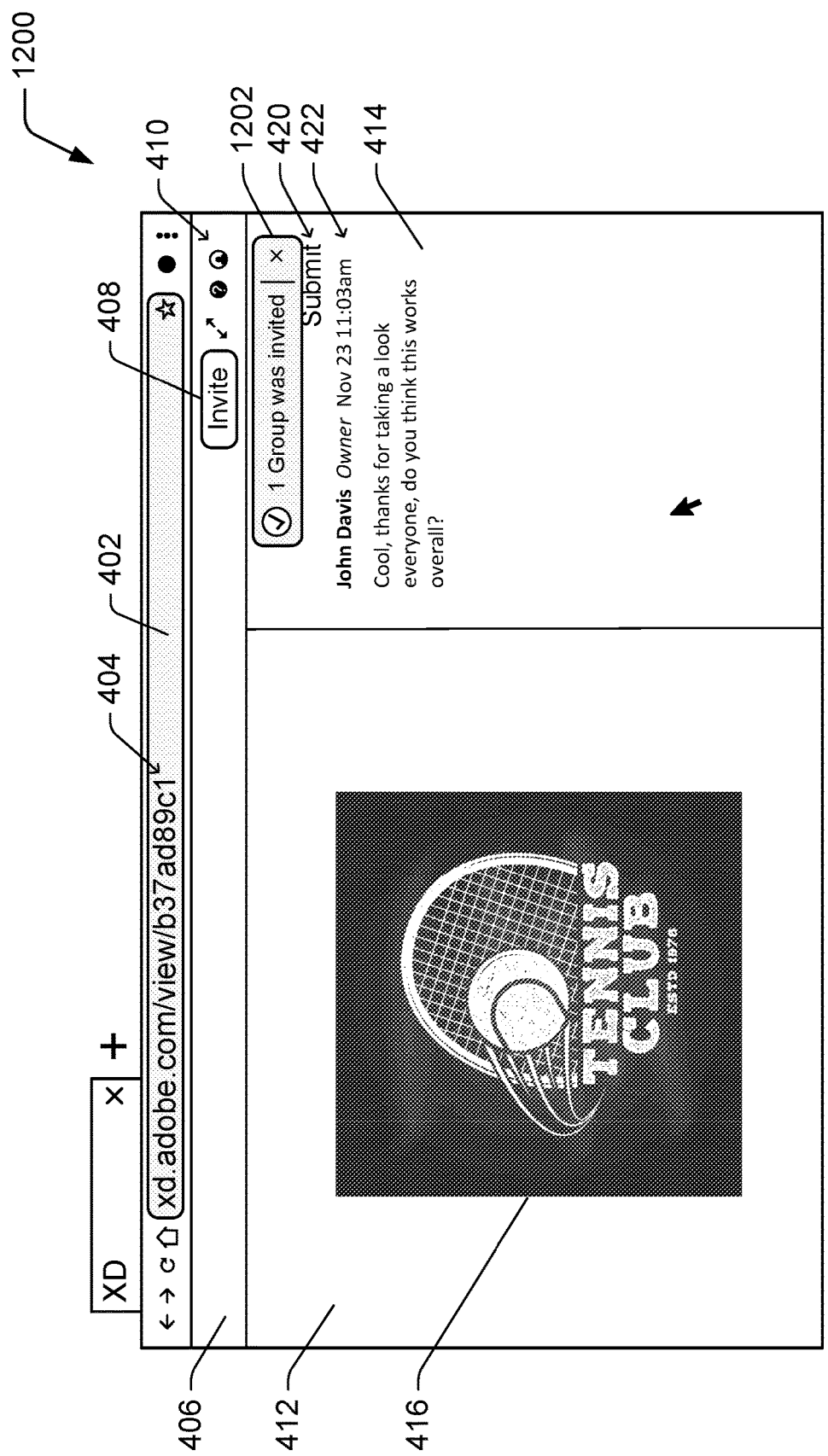

FIG. 12 illustrates another view 1200 of the example collaboration system UI. The view 1200 is a view of the collaboration system UI displayed in response to the project owner selecting the invite button 1108 (e.g., by the user touching or clicking on the create button 1108) in view 1100 of FIG. 11. In the view 1200, a dialog box 1202 is displayed to notify the project owner that an invitation to access the collaboration project has been sent to the selected one or more individual users, one or more groups, or a combination thereof. In the illustrated example, the dialog box 1202 indicates that an invitation to access the collaboration project has been sent to one group. The view 1200 is analogous to the view 400 of FIG. 4, except for the display of the dialog box 1202.

Figure 13:
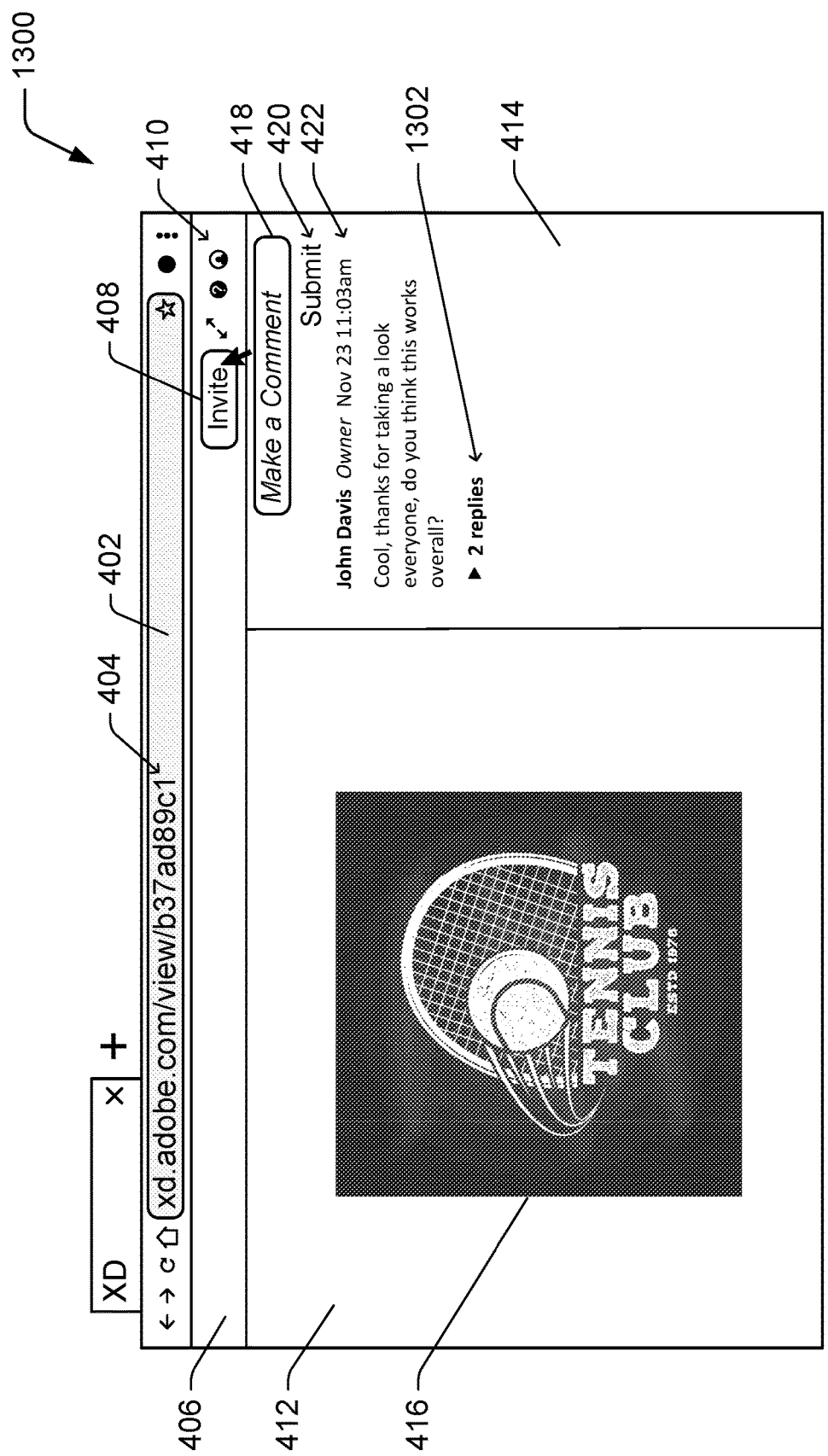
FIGS. 13, 14, 15, 16, 17, 18, and 19 illustrate additional example views of ad hoc group management within a collaboration project sharing workflow.

FIGS. 13-19 illustrate another example of ad hoc group management within a collaboration project sharing workflow. The views illustrated in FIGS. 13-19 can be displayed in various manners, such as by a standalone application, inside a web browser, and so forth. FIG. 13 illustrates a view 1300 of an example collaboration system UI for a project collaboration system, such as project collaboration system 110. The view 1300 of the collaboration system UI is similar to the view 400 of FIG. 4, including the application bar portion 402 in which the name 404 of the collaboration project is displayed, and the application bar portion 406 in which the sharing button 408 and optionally the control icons 410 are displayed. The view 1300 of the collaboration system UI also includes the project portion 412 and the comments portion 414. The comments portion 414 includes the comment initiation text entry field 418, the submit link 420, and the comment 422.

The view 1300 differs from the view 400 in that two other users have replied to the comment 422. This is illustrated as the notification 1302 indicating that two replies to the comment 422 have been received. A triangle adjacent to the "2 replies" text can be selected by the project owner to have the two replies to the comment 422 displayed in the comments portion 414.

Figure 14:
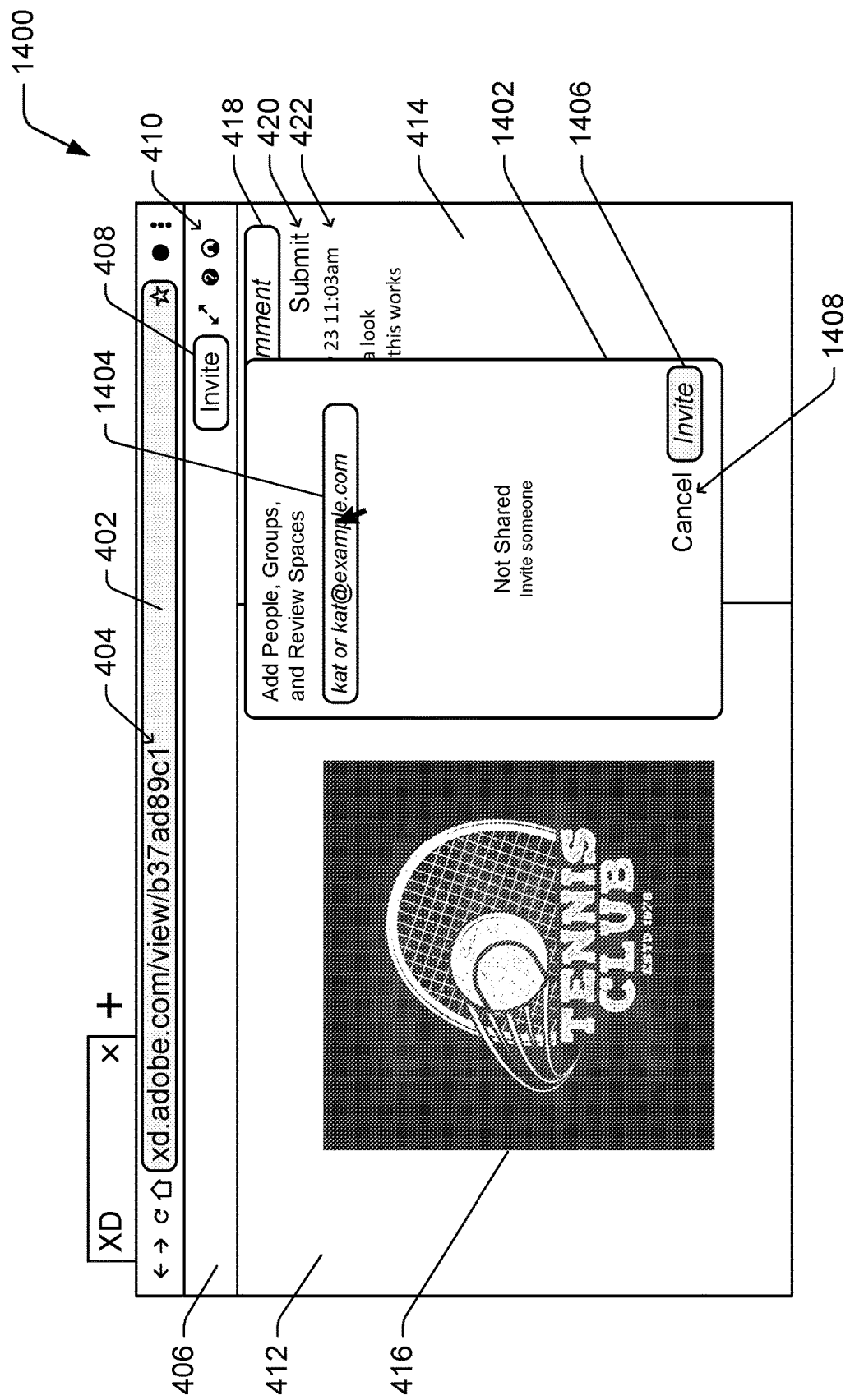

FIG. 14 illustrates another view 1400 of the example collaboration system UI. The view 1400 is a view of the collaboration system UI displayed in response to the project owner selecting the sharing button 408 (e.g., by the user touching or clicking on the sharing button 408) in view 1300 of FIG. 13. The view 1400 of the collaboration system UI includes the application bar portion 402 in which the name 404 of the collaboration project is displayed, and the application bar portion 406 in which the sharing button 408 and optionally the control icons 410 are displayed. The view 1400 of the collaboration system UI also includes the project portion 412 and the comments portion 414. The comments portion 414 includes the comment initiation text entry field 418, the submit link 420, and the comment 422.

The view 1400 of the collaboration system UI also includes a dialog box 1402. The dialog box 1402 prompts the user to add people, groups, and review spaces with which to share the collaboration project. The dialog box 1402 includes a text entry field 1404 into which the project owner can enter an identifier (e.g., email address, instant messaging address or identifier, group identifier) of a user or group of users with which to share the collaboration project. The letters "kat" and "kat@example.com" are displayed in the text entry field 1404 as example of identifiers that can be entered. The dialog box 1402 also includes an invite button 1406, illustrated as a button labeled "Invite", that is selected by the project owner to send an invitation to other users to access the collaboration project. The invite button 1406 is shown shadowed out and the word "Invite" is in italics to indicate that the invite button 1406 cannot be selected in the view 1400. The dialog box 1402 also includes a cancel option 1408 that is selected by the project owner to close the dialog box 1402 without sending an invitation to other users to access the collaboration project.

Figure 15:
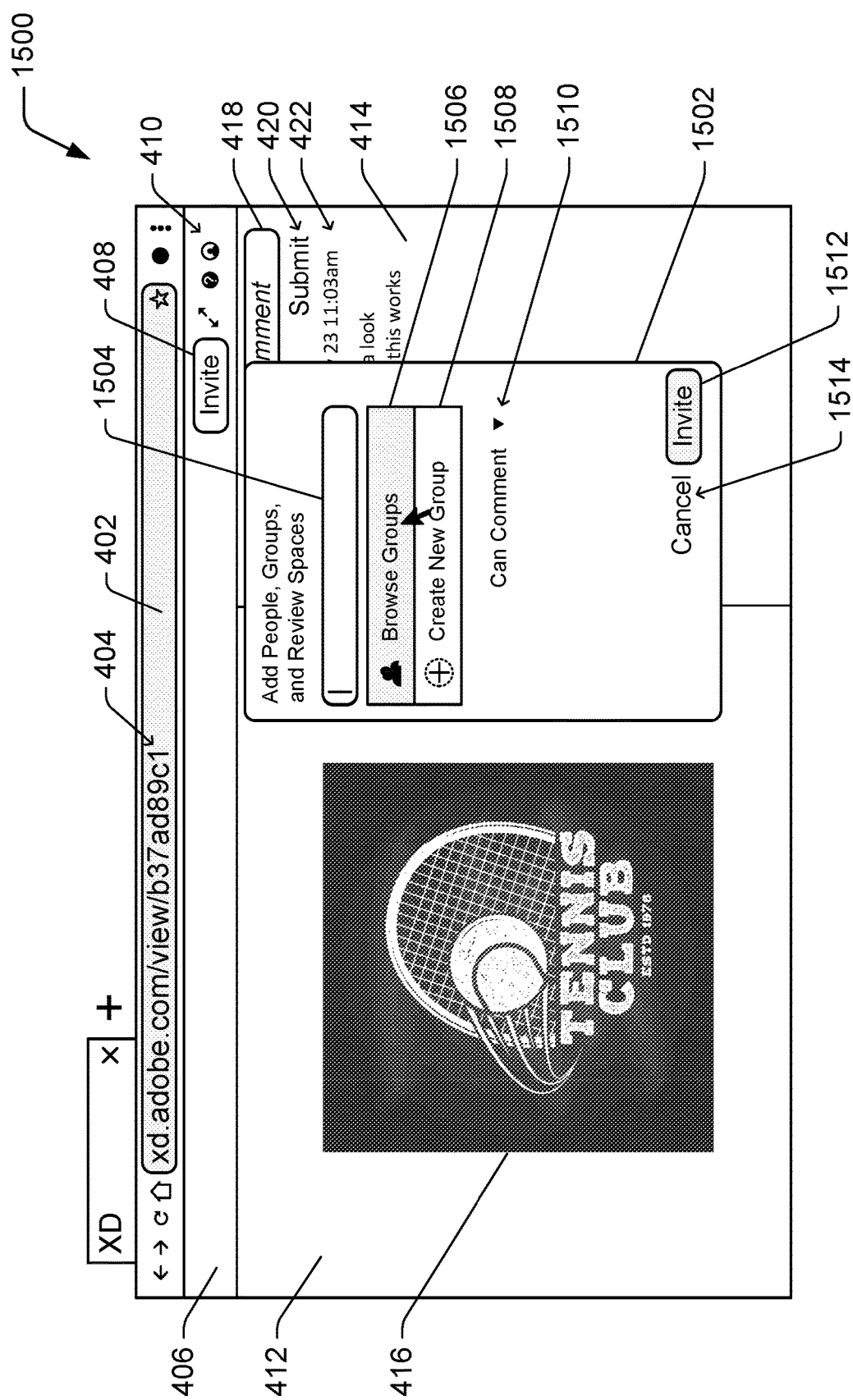

FIG. 15 illustrates another view 1500 of the example collaboration system UI. In one or more implementations, the view 1500 is a view of the collaboration system UI displayed in response to the project owner selecting an option to manage groups from the view 1400 of FIG. 14. For example, a user-selectable button or link can be displayed in the view 1400, gestures or other inputs can be received at the view 1400, and so forth. Additionally or alternatively, the view 1500 is a view of the collaboration system UI displayed in response to the project owner selecting the sharing button 408 (e.g., by the user touching or clicking on the sharing button 408) in the view 1300 of FIG. 13. In such situations, the view 1400 of the collaboration system UI need not be displayed.

The view 1500 of the collaboration system UI includes the application bar portion 402 in which the name 404 of the collaboration project is displayed, and the application bar portion 406 in which the sharing button 408 and optionally the control icons 410 are displayed. The view 1500 of the collaboration system UI also includes the project portion 412 and the comments portion 414. The comments portion 414 includes the comment initiation text entry field 418, the submit link 420, and the comment 422.

The view 1500 of the collaboration system UI also includes a dialog box 1502. The dialog box 1502 prompts the user to add people, groups, and review spaces with which to share the collaboration project. The dialog box 1502 includes a text entry field 1504 into which the project owner can enter an identifier (e.g., email address, instant messaging address or identifier, group identifier) of a user or group of users with which to share the collaboration project.

The dialog box also includes a group editing option 1506 (illustrated as a browse groups button) and a group creation option 1508 (illustrated as a create new group button), both of which can be selected by the project owner (e.g., by touching or clicking on the option 1506, 1508). The group editing option 1506 can be selected to edit a previously created group. The group creation option 1508 can be selected to create a new group of users.

The dialog box 1502 also includes a comment control option 1510, illustrated as text "Can Comment" with an adjacent down arrow. The comment control option 1510 can be selected by the project owner to select whether users with which the collaboration project is shared are allowed to enter comments (e.g., in the same manner as comment 422). For example, in response to selection of the comment control option 1510, the view 1500 can be updated to show a "Can Comment" option and a "Cannot Comment" option, and the project owner can select which of those two options he or she desires for the collaboration project.

The dialog box 1502 also includes an invite button 1512, illustrated as a button labeled "Invite", that is selected by the project owner to send an invitation to other users to access the collaboration project. The dialog box 1502 also includes a cancel option 1514 that is selected by the project owner to close the dialog box 1502 without sending an invitation to other users to access the collaboration project.

Figure 16:
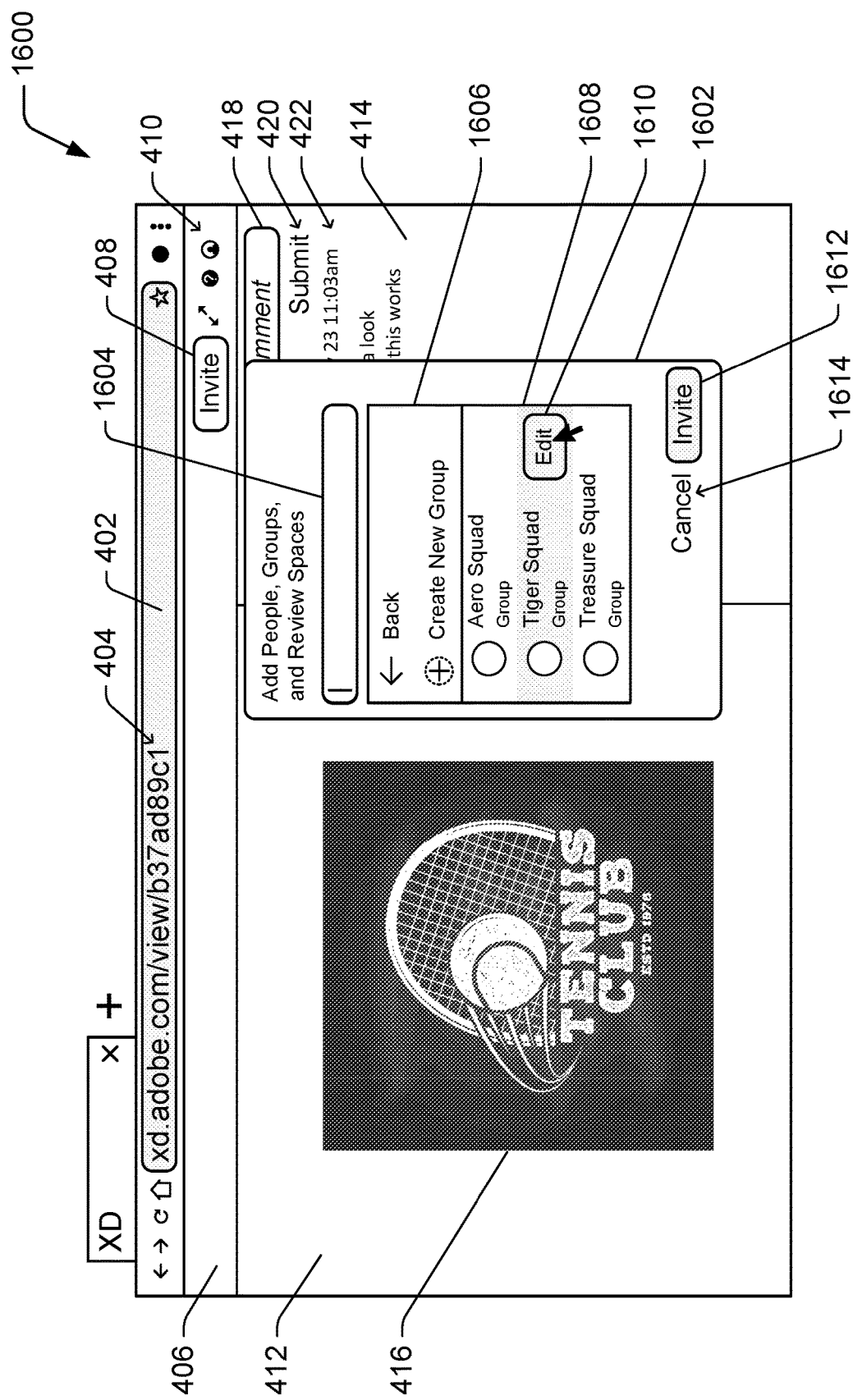

FIG. 16 illustrates another view 1600 of the example collaboration system UI. The view 1600 is a view of the collaboration system UI displayed in response to the project owner selecting the group editing option 1506 (e.g., by the user touching or clicking on the browse groups button) in view 1500 of FIG. 6.

The view 1600 of the collaboration system UI includes the application bar portion 402 in which the name 404 of the collaboration project is displayed, and the application bar portion 406 in which the sharing button 408 and optionally the control icons 410 are displayed. The view 1600 of the collaboration system UI also includes the project portion 412 and the comments portion 414. The comments portion 414 includes the comment initiation text entry field 418, the submit link 420, and the comment 422.

The view 1600 of the collaboration system UI also includes a dialog box 1602 that prompts the project owner to edit a previously created group of users. The dialog box 1602 includes a text entry field 1604 into which the project owner can enter a name of the group he or she desires to edit. Additionally or alternatively, the previously created groups that the project owner is able to edit (e.g., the groups previously created by the project owner) can be displayed in the dialog box for selection by the project owner as discussed in more detail below.

The dialog box 1602 also includes a navigation portion 1606 and a group selection portion 1608. The navigation portion 1606 includes a back option (illustrated as the word "Back" with an adjacent left facing arrow) and a create new group option (illustrated as "Create New Group" with an adjacent circle enclosing a "+" sign). Selection of the back option causes the view 1500 of FIG. 15 to be displayed. Selection of the create new group option causes the view 700 of FIG. 7 to be displayed.

The group selection portion 1608 includes identifiers of previously created groups that the project owner is able to edit. These groups can be obtained, for example, by the group management system 206 from the contact information system 102. As illustrated, the previously created groups that the project owner are able to edit include a group named "Aero Squad", a group named "Tiger Squad", and a group named "Treasure Squad". As the project owner moves a cursor over different groups, the group that the cursor is over at any given time is highlighted and an edit button is displayed. In the illustrated example, the cursor is over the group named "Tiger Squad" and an edit button 1610 is displayed. The project owner can select the edit button 1610 (e.g., by touching or clicking on the edit button 1610) to edit the group named "Tiger Squad". The project owner can select the group named "Tiger Squad" (e.g., by touching or clicking on the name "Tiger Squad") to select the group named "Tiger Squad" to receive an invitation to access the collaboration project.

The dialog box 1602 also includes an invite button 1612, illustrated as a button labeled "Invite", that is selected by the project owner to send an invitation to other users to access the collaboration project. The dialog box 1602 also includes a cancel option 1614 that is selected by the project owner to close the dialog box 1602 without creating a new group.

Figure 17:
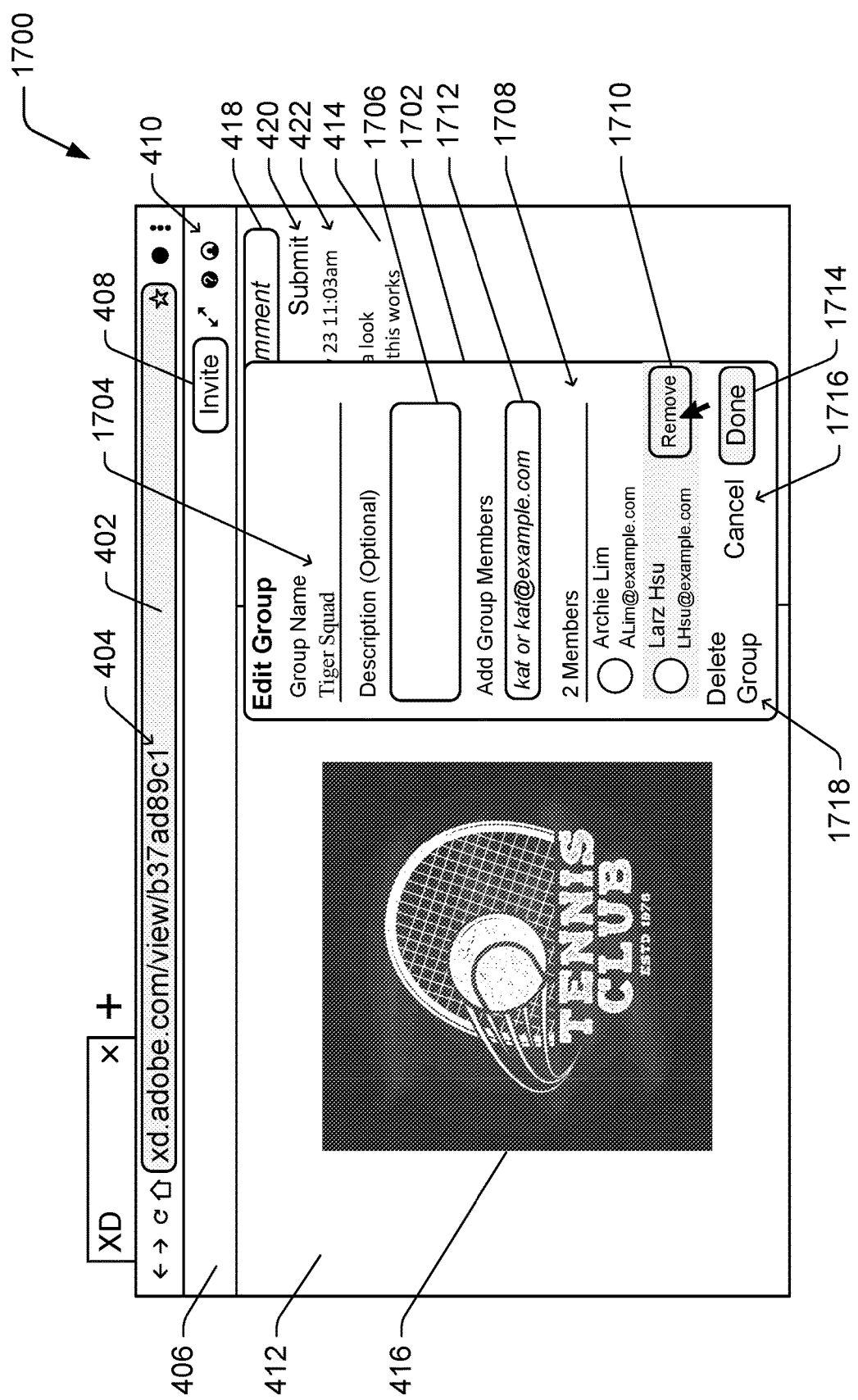

FIG. 17 illustrates another view 1700 of the example collaboration system UI. The view 1700 is a view of the collaboration system UI displayed in response to the project owner selecting the edit button 1610 (e.g., by the user touching or clicking on the edit button 1610) in view 1600 of FIG. 16. The view 1700 includes a dialog box 1702. In the view 1700, the project owner has selected to edit the new group named "Tiger Squad", which includes as members the users named "Archie Lim" and "Larz Hsu" as discussed above. The name of this group is displayed in the text entry field 1704, allowing the project owner to change the name of the group if he or she desires by entering the new group name in the text entry field 1704. The dialog box 1702 also includes a description text entry field 1706 that allows the project owner to add, delete, or edit a description for the group. This description is optional, and can include any information the project owner desires.

The dialog box 1702 also includes a member selection portion 1708 that includes identifiers of members of the group. The members in the group can be obtained, for example, by the group management system 206 from the contact information system 102. As illustrated, the group includes as members the users named "Archie Lim" and "Larz Hsu". As the project owner moves a cursor over different groups, the group that the cursor is over at any given time is highlighted and a remove button is displayed. In the illustrated example, the cursor is over the user named "Larz Hsu". The project owner can select the remove button 1710 (e.g., by touching or clicking on the remove button 1710) to have the user named "Larz Hsu" removed from the group.

The dialog box 1702 also includes a text entry field 1712 into which the project owner can enter an identifier (e.g., name, email address, or other identifier) of a user to add to the group. The letters "kat" and "kat@example.com" are displayed in the text entry field 1702 as examples of identifiers that can be entered.

The dialog box 1702 also includes a done button 1714, illustrated as a button labeled "Done", that is selected by the project owner to indicate that he or she is finished editing the group. In response to user selection of the done button 1714, the changes made to the group are saved (e.g., the group management system 206 sends the changes to the contact information system 102 for saving). The project collaboration system 110 then returns to displaying the view 1600 of FIG. 16.

The dialog box 1702 also includes a cancel option 1716 that is selected by the project owner to close the dialog box 1702 without saving any changes made to the group. The dialog box 1704 also includes a delete group option 1718 that is selected by the project owner to delete the group. In response to user selection of the delete group option 1718, the group management system 206 sends a notification to the contact information system 102 to delete the group, and the contact information system 102 deletes the group.

Although not illustrated in FIG. 17, it should be noted that additional information regarding the group can also be changed by the project owner and displayed in the view 1700. For example, an image representing the group (e.g., a picture of a tiger) can be changed by the project owner and optionally displayed adjacent to (e.g., in a circle to the left of) the text entry field 1706. This change in the image representing the group can be, for example, adding an image, replacing a previous image, removing an image (so that no image is associated with the group), and so forth. This change in the image is subsequently saved as part of the group information for the group.

Figure 18:
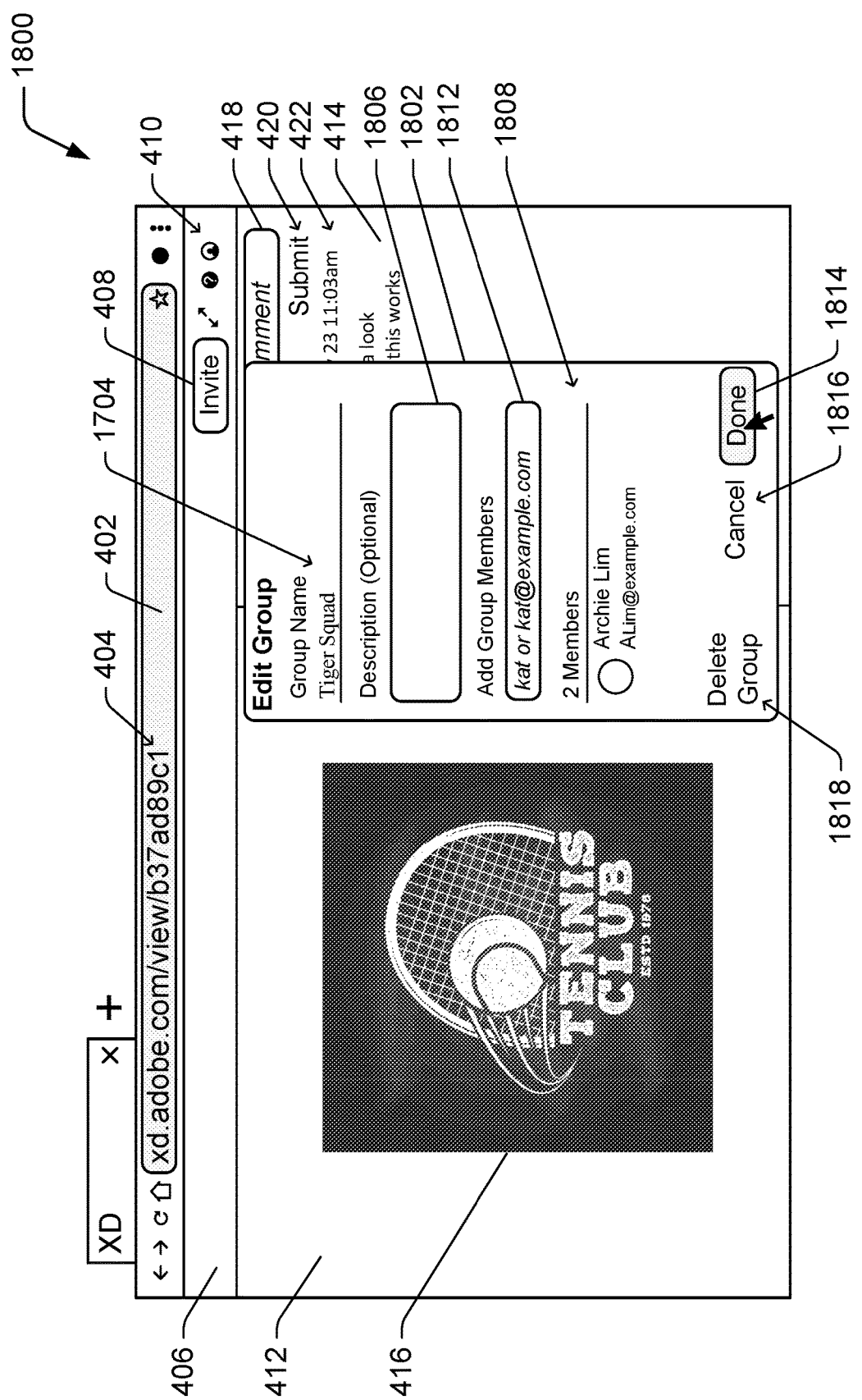

FIG. 18 illustrates another view 1800 of the example collaboration system UI. The view 1800 is a view of the collaboration system UI displayed in response to the project owner selecting the remove button 1710 in view 1700 of FIG. 17. The view 1800 is analogous to the view 1700 of FIG. 17, except that the member named "Larz Hsu" has been removed from the group.

Figure 19:
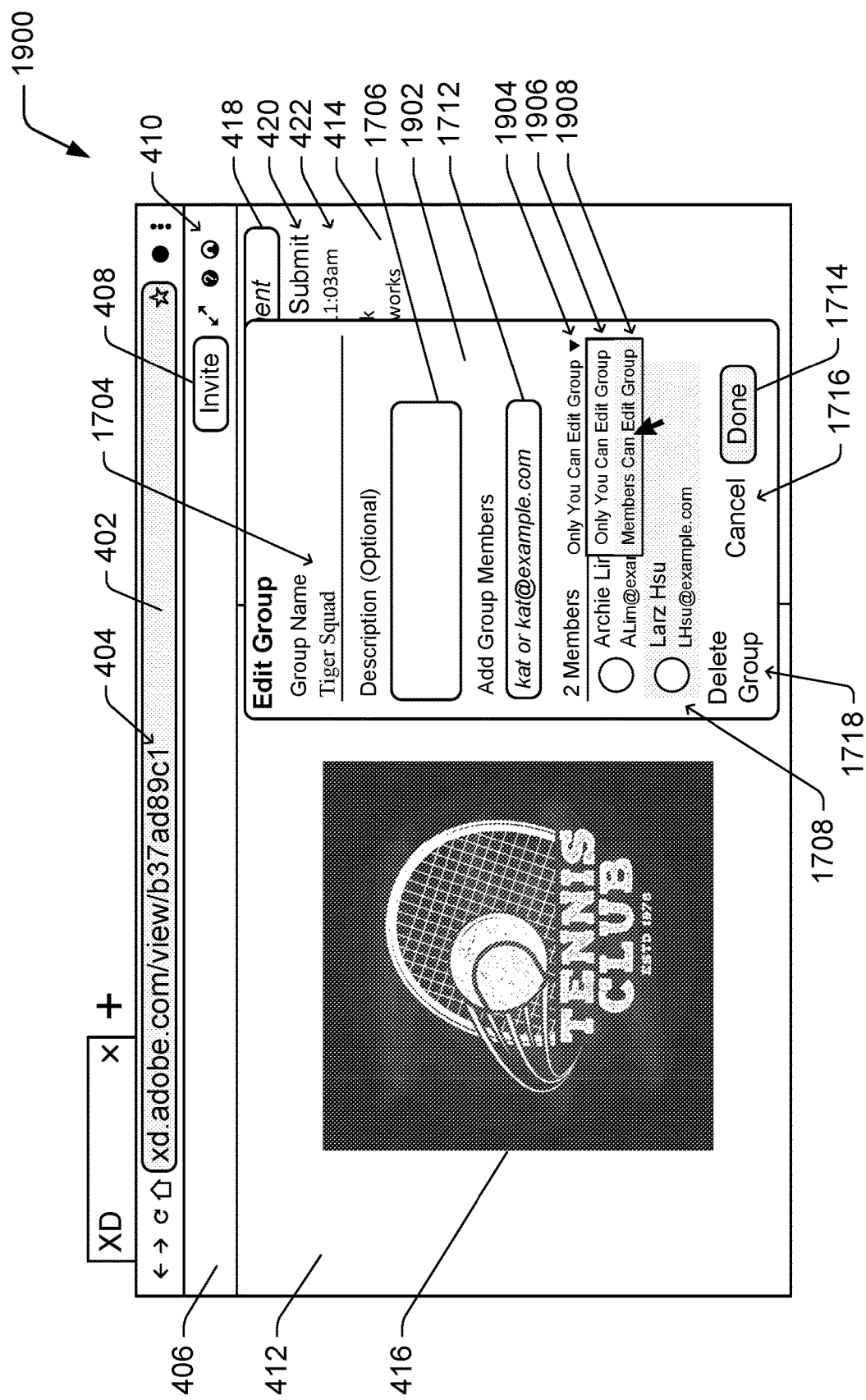

FIG. 19 illustrates another view 1900 of the example collaboration system UI. The view 1900 includes a dialog box 1902, and is a view of the collaboration system UI displayed in response to the project owner selecting the edit button 1610 (e.g., by the user touching or clicking on the edit button 1610) in view 1600 of FIG. 16, followed by the project owner selecting an edit permissions option 1904 (e.g., by the user touching or clicking on the down arrow adjacent to the "Only You Can Edit Group" text). The view 1900 is similar to the view 1700 of FIG. 17, except that the project owner is presented with the option to select a permission setting for the group.

In the view 1900, the name of the group being edited is displayed in the text entry field 1704, and a description text entry field 1706 allows the project owner to add, delete, or edit a description for the group. A member selection portion 1708 includes identifiers of members of the group. A text entry field 1712 allows the project owner to enter an identifier of a user to add to the group. The dialog box 1902 also includes a done button 1714, a cancel option 1716 that is selected by the project owner to close the dialog box 1702 without saving any changes made to the group, and a delete group option 1718.

The project owner can select the edit permissions option 1904, causing two options to be displayed, an "Only You Can Edit Group" option 1906 and a "Members Can Edit Group" option 1908. As the project owner moves a cursor over different options, the option that the cursor is over at any given time is highlighted. In the illustrated example, the cursor is over the "Members Can Edit Group" option 1908. In response to the project owner selecting the "Only You Can Edit Group" option 1906 (e.g., by touching or clicking on the "Only You Can Edit Group" option 1906), only the project owner is able to edit the group. An indication that only the project owner is able to edit the group is stored as part of the group information for the group. In response to the project owner selecting the "Members Can Edit Group" option 1908 (e.g., by touching or clicking on the "Members Can Edit Group" option 1908), then the project owner as well as any other member of the group is able to edit the group. An indication that the project owner as well as any other member of the group is able to edit the group is stored as part of the group information for the group.

In one or more implementations, the project collaboration system 110 also includes an option to share a collaboration project with other users by storing the collaboration project at a known location. This known location is a storage location known and accessible to the project owner as well as other users with which the collaboration project is being shared. For example, the known location can be a web page. In response to a user input requesting to share the collaboration project with other users (e.g., selection of an invite button as discussed in more detail below), the project sharing module 204 stores the collaboration project at the known location and causes a notification to be sent to the other users with which the collaboration project is being shared. This notification notifies the other users that the collaboration project has been saved at the known location.

Figure 20:
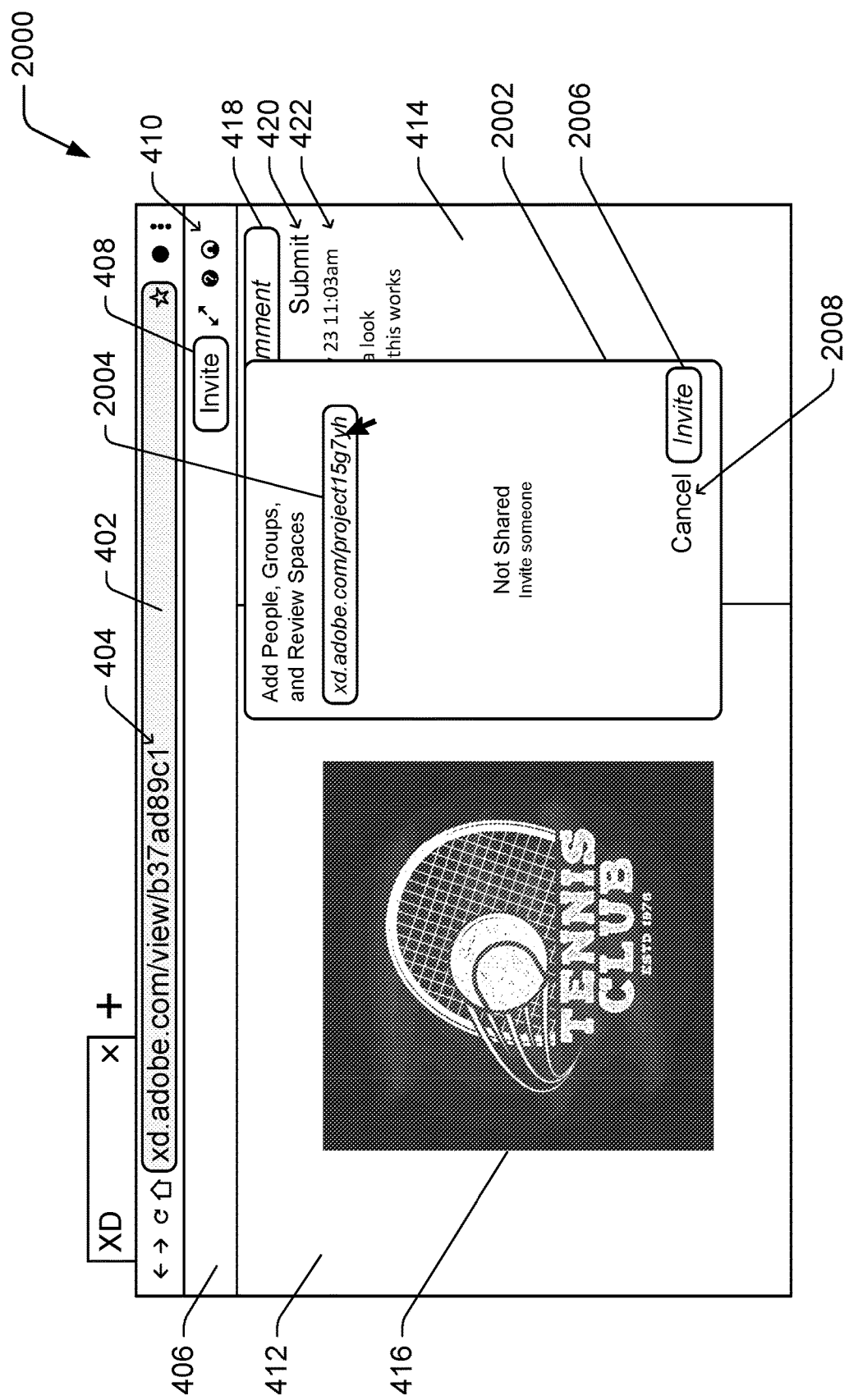
FIG. 20 illustrates an example view of the collaboration system UI storing a collaboration project at a known location.

FIG. 20 illustrates another view 2000 of the example collaboration system UI. The view 2000 can be displayed in various manners, such as by a standalone application, inside a web browser, and so forth. The view 2000 is a view of the collaboration system UI displayed in response to the project owner selecting the sharing button 408 (e.g., by the user touching or clicking on the sharing button 408) in view 400 of FIG. 4. The view 2000 of the collaboration system UI includes the application bar portion 402 in which the name 404 of the collaboration project is displayed, and the application bar portion 406 in which the sharing button 408, and optionally the control icons 410 are displayed. The view 2000 of the collaboration system UI also includes the project portion 412 and the comments portion 414. The comments portion 414 includes the comment initiation text entry field 418, the submit link 420, and the comment 422.

The view 2000 of the collaboration system UI also includes a dialog box 2002. The dialog box 2002 prompts the user to add people, groups, and review spaces with which to share the collaboration project. The dialog box 2002 includes a text entry field 2004 into which the project owner can enter a location where the collaboration project is to be stored. In the illustrated example, the user has entered a location of "xd.adobe.com/project15g7yh". Although illustrated as a web page, the identifier of the location can take other forms. The dialog box 2002 also includes an invite button 2006, illustrated as a button labeled "Invite", that is selected by the project owner to send an invitation to other users to access the collaboration project. The dialog box 2002 also includes a cancel option 2008 that is selected by the project owner to close the dialog box 2002 without sending an invitation to other users to access the collaboration project.

The location where the collaboration project is stored can be a location on the same device as implements the project collaboration system 110, or alternatively a different device. For example, the project collaboration system 110 may store the collaboration project on a server device accessed via the network 108.

Figure 21:
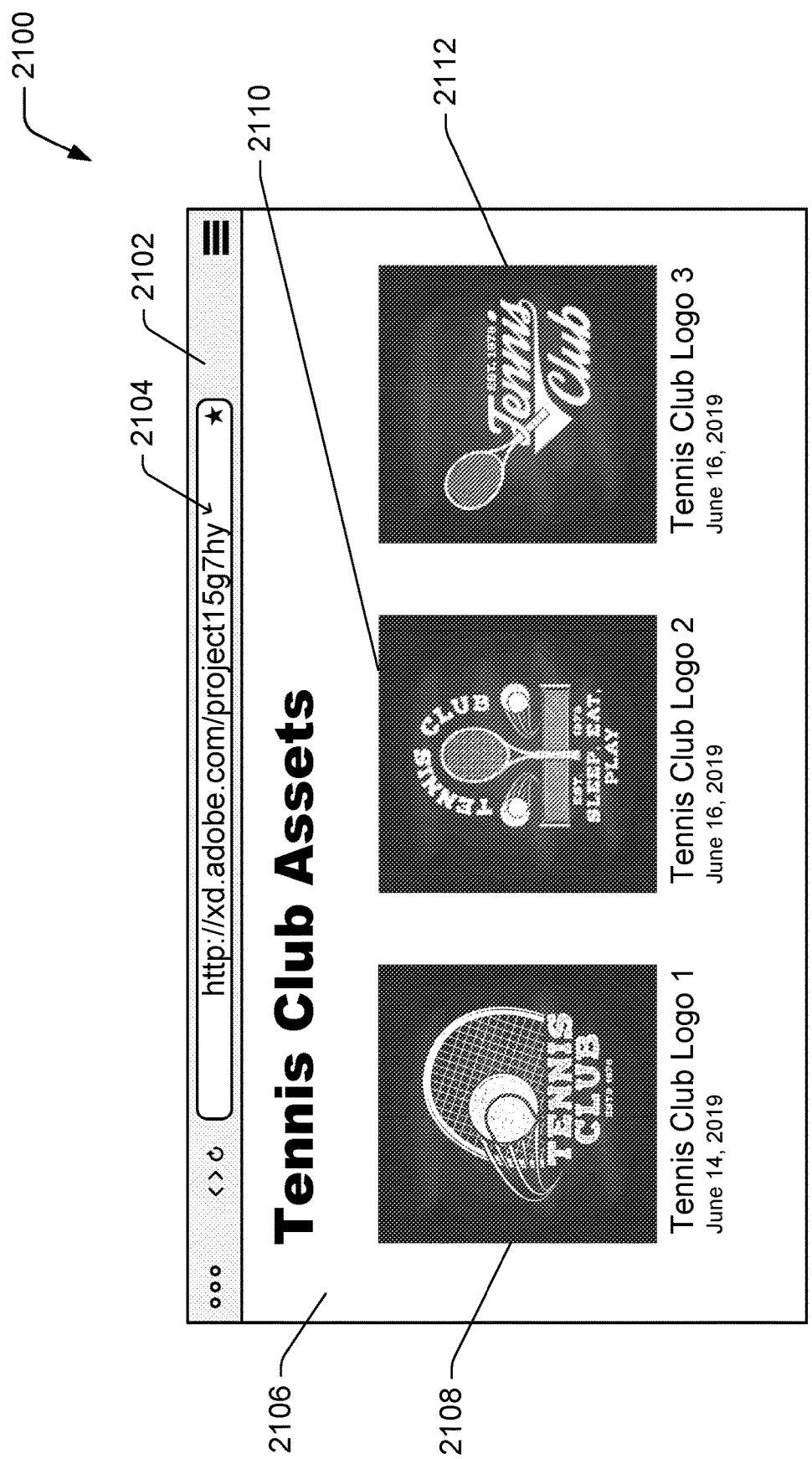
FIG. 21 illustrates a view of a collaboration project hosting device.

FIG. 21 illustrates a view 2100 of a collaboration project hosting device. The view 2100 can be displayed in various manners, such as by a standalone application, inside a web browser, and so forth. The collaboration project hosting device is a device on which the collaboration project is stored. The view 2100 is a view of the collaboration project hosting device displayed after the collaboration project has been stored at the collaboration project hosting device. The view 2100 of the collaboration system UI includes an address bar portion 2102 in which the storage location 2104 of the collaboration project is displayed. The view 2100 of the collaboration system UI also includes an asset portion 2106 in which various assets of the project owner are displayed. The project owner can select any of the displayed assets and share those assets with other users as part of a collaboration project as discussed above. In the illustrated example of FIG. 21, the assets are displayed as digital content 2108, 2110, and 2112. As illustrated, the assets are different logos for a tennis club. The name and associated date (e.g., date of creation, date of last editing, etc.) are also displayed.

Although particular functionality is discussed herein with reference to particular modules, it should be noted that the functionality of individual modules discussed herein can be separated into multiple modules, and/or at least some functionality of multiple modules can be combined into a single module.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-21.

Figure 22:
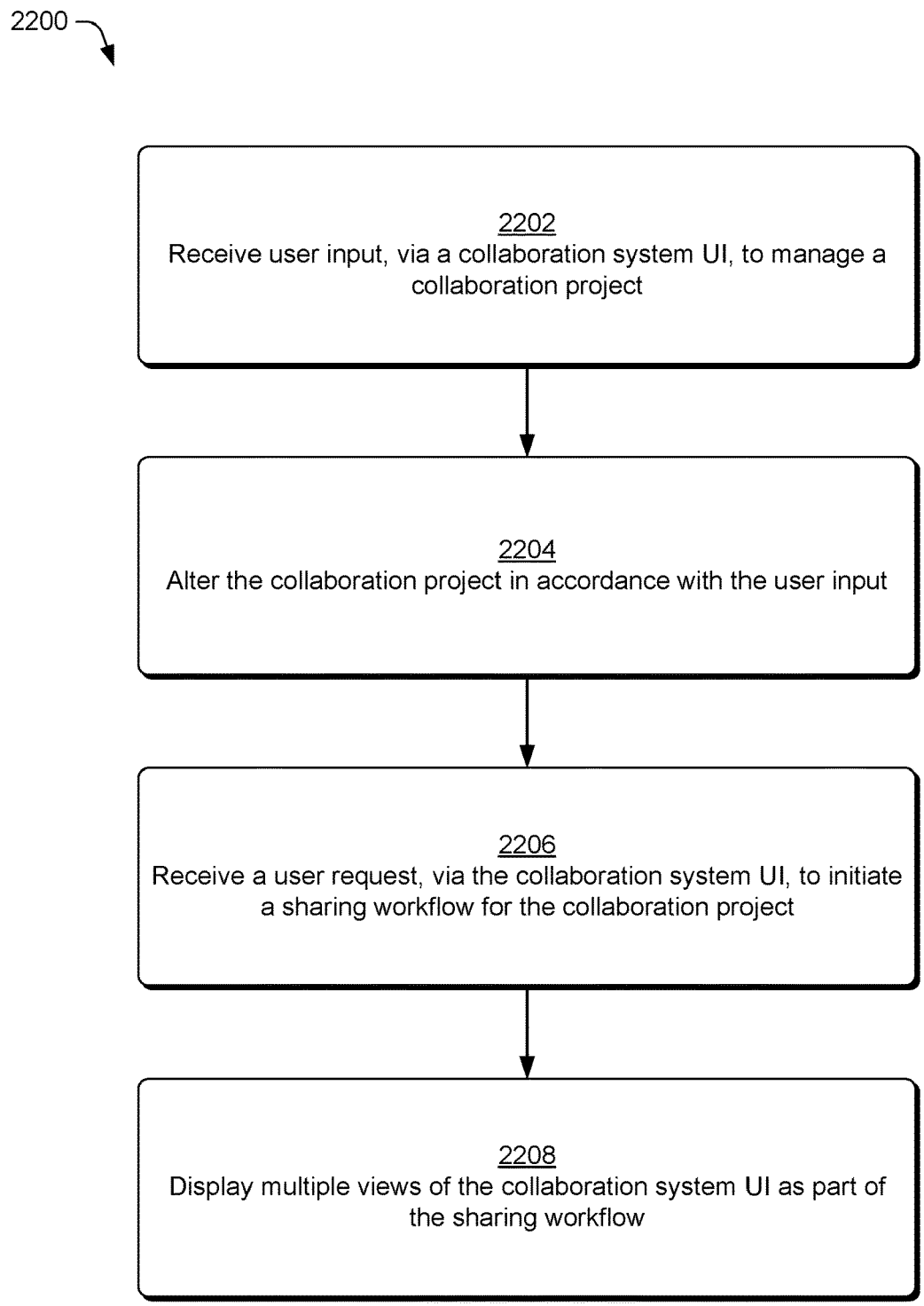
FIG. 22 is a flow diagram depicting a procedure in an example implementation of ad hoc group management within a collaboration project sharing workflow.

FIG. 22 is a flow diagram depicting a procedure in an example 2200 implementation of ad hoc group management within a collaboration project sharing workflow. Various user inputs and user requests are discussed with reference to FIG. 22. These user inputs and user requests can be received in various manners, such as mouse clicks, touchscreen inputs, voice inputs, text inputs, and so forth.

In example 2200, user input to manage a collaboration project is received via a collaboration system UI (block 2202). The user input in block 2202 can be received in various manners as discussed above.

The collaboration project is altered in accordance with the user input (block 2204). This alteration of the collaboration project can include creation of the collaboration project, editing of the collaboration project, and so forth.

A user request is received, via the collaboration system UI, to initiate a sharing workflow for the collaboration project (block 2206). This user request is, for example, a request by a project owner for the collaboration system to display one or more views (e.g., screens or windows) allowing the project owner to share the collaboration project with other users.

In response to the user request, multiple views of the collaboration system UI are displayed as part of the sharing workflow (block 2208). These multiple views allow for the creation and editing of groups within the sharing workflow.

Figure 23:
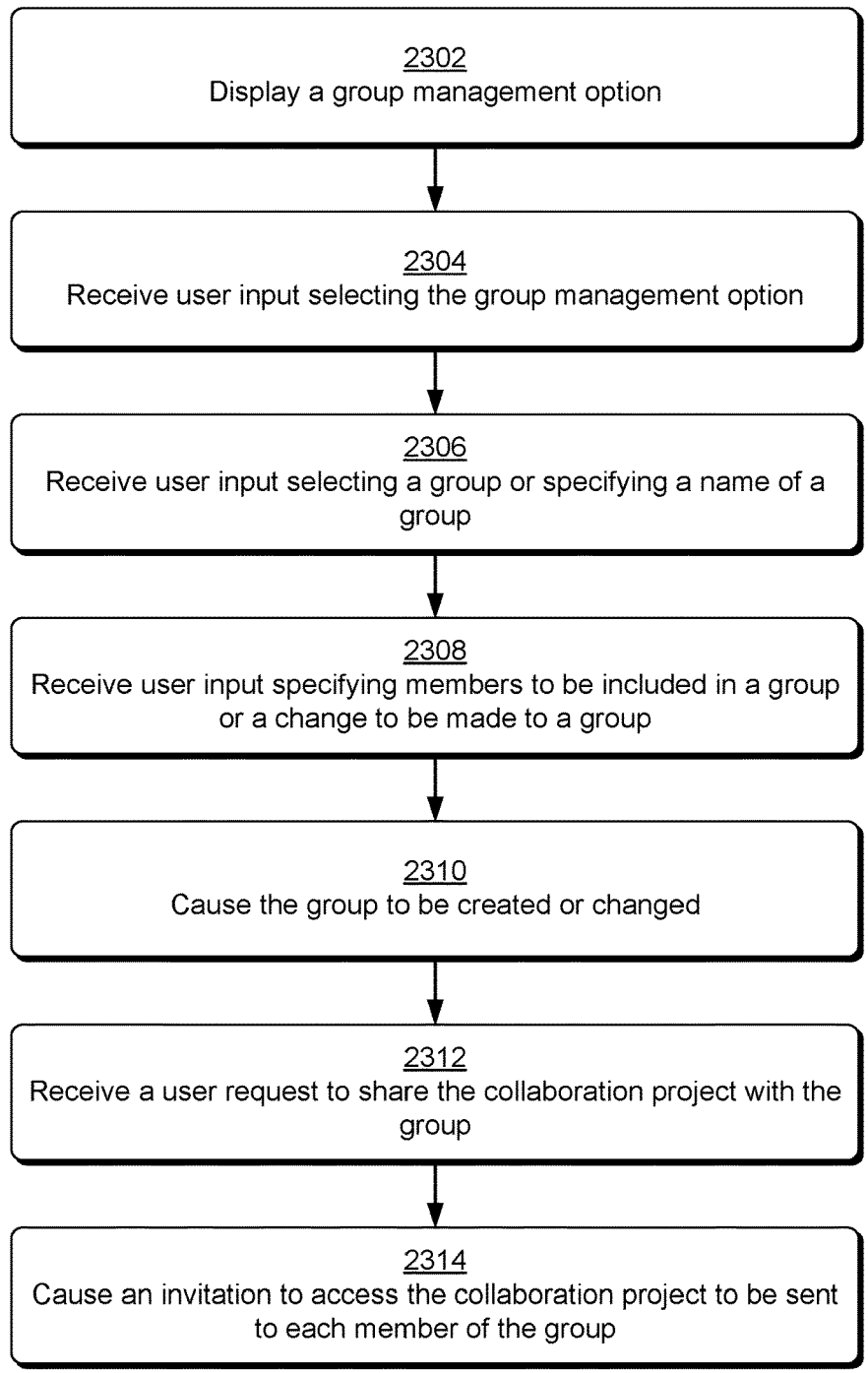
FIG. 23 is a flow diagram depicting an example procedure performed in displaying multiple views of the collaboration system UI are displayed as part of the sharing workflow.

FIG. 23 is a flow diagram depicting an example procedure performed in block 2208 of FIG. 22. Various user inputs and user requests are discussed with reference to FIG. 23. These user inputs and user requests can be received in various manners, such as mouse clicks, touchscreen inputs, voice inputs, text inputs, and so forth.

In this example 2208, a group management option is displayed (block 2302). The group management option can be, for example, a group creation option or a group editing option. The group management option can be displayed in various manners, such as a button, a menu item, a text prompt, and so forth.

A user input selecting the group management option is received (block 2304). This user input can be received in various manners as discussed above.

A user input selecting a group or specifying a name of a group is also received (block 2306). This user input can be, for example, user selection of a group to edit, user input of the name of a new group to be created, and so forth.

User input specifying members to be included in a group or a change to be made to the group is also received (block 2308). For example, identifiers of users can be input or selected by the project owner, changes to a name of a group or which members are included in the group can be received, and so forth.

One or more actions to cause the group to be created or changed in accordance with the user input received in block 2308 are taken (block 2310). These actions can include, for example, communicating with a contact information system to store group information describing a newly created group, to store updated group information reflecting changes made to a previously created group, and so forth.

A user request to share the collaboration project with the group is also received (block 2312). This user request can be received in various manners as discussed above.

One or more actions to cause an invitation to access the collaboration project to be sent to each of the members of the group are taken (block 2314). These actions can include, for example, sending the invitation, communicating with another program or module (e.g., an email program or an instant messaging program) to send the invitation, and so forth.

Example System and Device

Figure 24:
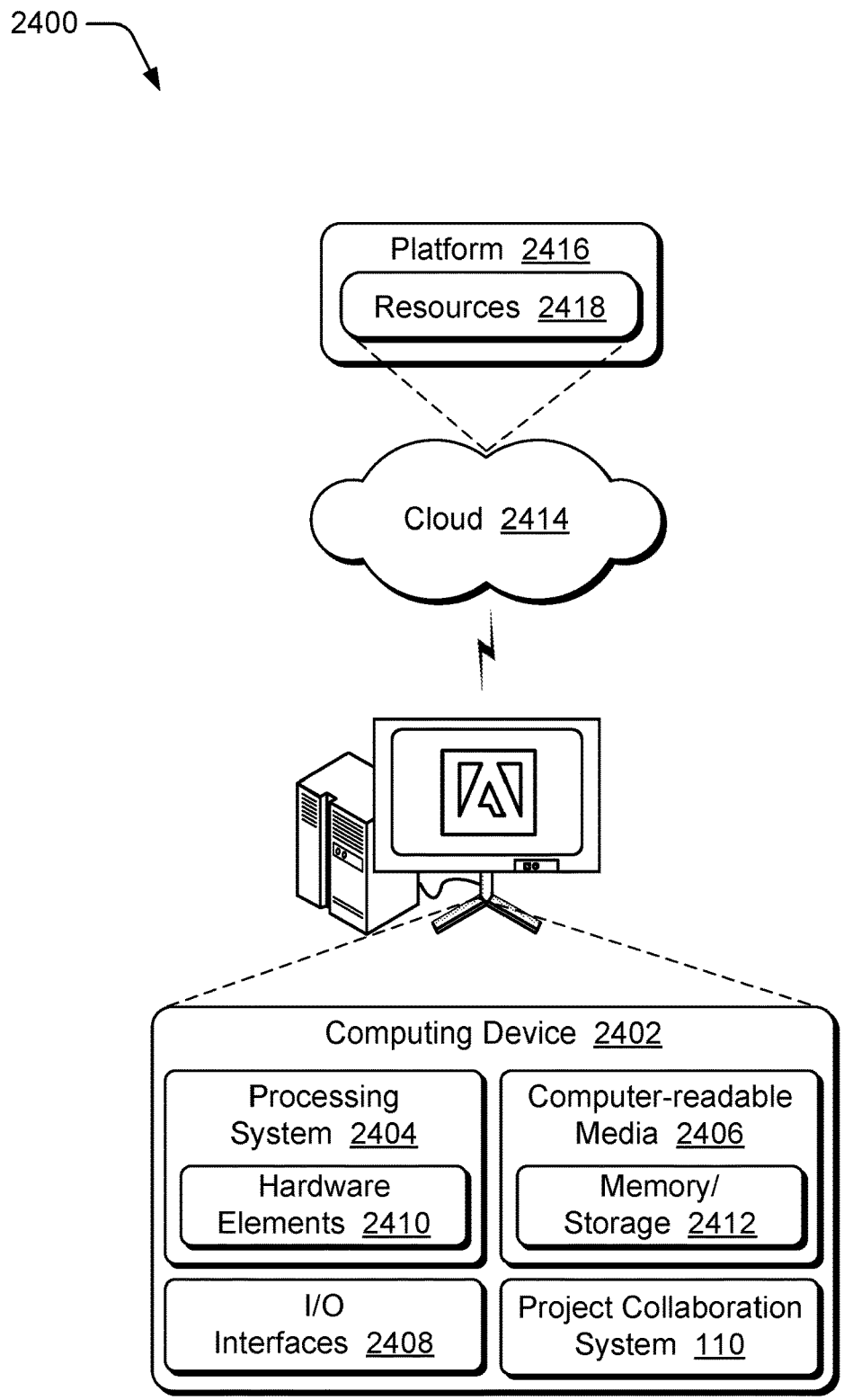
FIG. 24 illustrates an example system that includes an example computing device that is representative of one or more computing systems and/or devices that may implement the various techniques described herein.

FIG. 24 illustrates an example system generally at 2400 that includes an example computing device 2402 that is representative of one or more computing systems and/or devices that may implement the various techniques described herein. This is illustrated through inclusion of the project collaboration system 110. The computing device 2402 may be, for example, a server of a service provider, a device associated with a client (e.g., a client device), an on-chip system, and/or any other suitable computing device or computing system. Although illustrated as including the project collaboration system 110, additionally or alternatively the computing device 2402 can include the contact information system 102, a collaboration project hosting system (e.g., to store collaboration projects as web pages for access by the project owner and other users), and so forth.

The example computing device 2402 as illustrated includes a processing system 2404, one or more computer-readable media 2406, and one or more I/O interface 2408 that are communicatively coupled, one to another. Although not shown, the computing device 2402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2404 is representative of functionality to perform one or more operations using hardware. Accordingly, the processing system 2404 is illustrated as including hardware element 2410 that may be configured as processors, functional blocks, and so forth. This may include implementation in hardware as an application specific integrated circuit or other logic device formed using one or more semiconductors. The hardware elements 2410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2406 is illustrated as including memory/storage 2412. The memory/storage 2412 represents memory/storage capacity associated with one or more computer-readable media. The memory/storage component 2412 may include volatile media (such as random access memory (RAM)) and/or nonvolatile media (such as read only memory (ROM), Flash memory, optical disks, magnetic disks, and so forth). The memory/storage component 2412 may include fixed media (e.g., RAM, ROM, a fixed hard drive, and so on) as well as removable media (e.g., Flash memory, a removable hard drive, an optical disc, and so forth). The computer-readable media 2406 may be configured in a variety of other ways as further described below.

Input/output interface(s) 2408 are representative of functionality to allow a user to enter commands and information to computing device 2402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2402. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer- readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 2402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2410 and computer-readable media 2406 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2410. The computing device 2402 may be configured to implement particular instructions and/or functions corresponding to the software and/or hardware modules. Accordingly, implementation of a module that is executable by the computing device 2402 as software may be achieved at least partially in hardware, e.g., through use of computer-readable storage media and/or hardware elements 2410 of the processing system 2404. The instructions and/or functions may be executable/operable by one or more articles of manufacture (for example, one or more computing devices 2402 and/or processing systems 2404) to implement techniques, modules, and examples described herein.

The techniques described herein may be supported by various configurations of the computing device 2402 and are not limited to the specific examples of the techniques described herein. This functionality may also be implemented all or in part through use of a distributed system, such as over a "cloud" 2414 via a platform 2416 as described below.

The cloud 2414 includes and/or is representative of a platform 2416 for resources 2418. The platform 2416 abstracts underlying functionality of hardware (e.g., servers) and software resources of the cloud 2414. The resources 2418 may include applications and/or data that can be utilized while computer processing is executed on servers that are remote from the computing device 2402. Resources 2418 can also include services provided over the Internet and/or through a subscriber network, such as a cellular or Wi-Fi network.

The platform 2416 may abstract resources and functions to connect the computing device 2402 with other computing devices. The platform 2416 may also serve to abstract scaling of resources to provide a corresponding level of scale to encountered demand for the resources 2418 that are implemented via the platform 2416. Accordingly, in an interconnected device embodiment, implementation of functionality described herein may be distributed throughout the system 2400. For example, the functionality may be implemented in part on the computing device 2402 as well as via the platform 2416 that abstracts the functionality of the cloud 2414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment with which to share a collaboration project with a group, a method implemented by a processing device comprising:

receiving a user request to initiate a sharing workflow for the collaboration project;

displaying, as part of the sharing workflow and in response to the user request to share the collaboration project, a dialog box including a group management option to create a group, the dialog box displayed concurrently with the collaboration project;

receiving, as part of the sharing workflow, a first user input from a user selecting the group management option to create the group;

receiving, as part of the sharing workflow and via a text entry field of the dialog box, a second user input that is an identifier of a user to include in the group;

causing the group to be created and the user included in the group to be stored by communicating an indication of the group and the identifier of the user to a contact information system for storage;
receiving a user request, as part of the sharing workflow and via a user interface element of the dialog box, to share the collaboration project with the group; and
causing, in response to the user request to share the collaboration project, an invitation to access the collaboration project to be sent to each member of the group.

2. The method of claim 1, the method further comprising:
receiving, as part of the sharing workflow and via the dialog box, a third user input specifying a name of the group; and
causing the name of the group to be saved as associated with the group by communicating the name of the group to the contact information system for storage.

3. The method of claim 1, the method further comprising:
receiving, as part of the sharing workflow and via the dialog box, user input selecting the group;
receiving, as part of the sharing workflow and via the dialog box, user input specifying one or more changes to make to the group; and
causing the one or more changes to be made to the group by communicating an indication of the one or more changes to the contact information system for storage.

4. The method of claim 3, the one or more changes including changing a name of the group.

5. The method of claim 1, further comprising receiving user input, as part of the sharing workflow and via the dialog box, indicating whether members of the group or only a project owner can edit the group.

6. The method of claim 1, wherein the collaboration project comprises digital content being created or edited.

7. The method of claim 1, further comprising receiving user input, as part of the sharing workflow and via the dialog box, setting a permission for the group indicating that the group is private and is accessible only to a project owner.

8. The method of claim 1, further comprising receiving a third user input, as part of the sharing workflow and via the dialog box, indicating members of the group can edit the group, and causing an indication that members of the group can edit the group to be associated with the group by communicating the indication that members of the group can edit the group to the contact information system for storage.

9. The method of claim 1, wherein receiving the second user input includes communicating the second user input to the contact information system, and receiving, from the contact information system, the identifier of the user.

10. A project collaboration system comprising:
a group management system to present a sharing workflow for a collaboration project and to receive a user request to initiate a sharing workflow for the collaboration project, the group management system including a group creation module configured to allow a collaboration project owner to create a group while within the sharing workflow by displaying, as part of the sharing workflow and in response to the user request to share the collaboration project, a dialog box including a group management option to create a group concurrently with the collaboration project, receiving, as part of the sharing workflow, a first user input from a user selecting the group management option to create the group, receiving, as part of the sharing workflow and via a text entry field of the dialog box, a second user input that is an identifier of a user to include in the group, and causing the group to be created and the user included in the group to be stored by communicating an indication of the group and the identifier of the user to a contact information system for storage; and
a project sharing module to cause the collaboration project to be shared with the group by receiving a user request, as part of the sharing workflow and via a user interface element of the dialog box, to share the collaboration project with the group and causing, in response to the user request to share the collaboration project, an invitation to access the collaboration project to be sent to each member of the group.

11. The project collaboration system of claim 10, the group creation module being further configured to receive a third user input, as part of the sharing workflow and via the dialog box, specifying a name of the group, and cause the name of the group to be saved as associated with the group by communicating the name of the group to the contact information system for storage.

12. The project collaboration system of claim 10, the group creation module being further configured to receive a third user input, as part of the sharing workflow and via the dialog box, indicating whether members of the group or only the collaboration project owner can edit the group, and cause an indication of whether members of the group or only the collaboration project owner can edit the group to be saved as associated with the group by communicating the indication of whether members of the group or only the collaboration project owner can edit the group to the contact information system for storage.

13. The project collaboration system of claim 10, the group management system further including a group editing module configured to allow a user to edit the group while within the sharing workflow by receiving user input via the dialog box selecting a group editing option, receiving user input via the dialog box selecting the group and one or more changes to make to the group, and causing the one or more changes to be made to the group by communicating an indication of the one or more changes to the contact information system for storage.

14. The project collaboration system of claim 13, the one or more changes including changing permissions indicating whether members of the group or only the collaboration project owner can edit the group.

15. The project collaboration system of claim 13, the one or more changes including changing a name of the group.

16. The project collaboration system of claim 10, wherein the collaboration project comprises digital content being created or edited.

17. In a digital medium environment with which to share a collaboration project with a group, a computing device comprising:
a processing device; and
a memory component coupled to the processing device storing multiple instructions that, responsive to execution by the processing device, cause the processing device to perform operations comprising:
receiving a user request to initiate a sharing workflow for the collaboration project;
displaying, as part of the sharing workflow and in response to the user request to share the collaboration project, a dialog box including a group management option to create a group, the dialog box displayed concurrently with the collaboration project;
receiving, as part of the sharing workflow, a first user input from a user selecting the group management option to create the group;

receiving, as part of the sharing workflow and via a text entry field of the dialog box, a second user input that is an identifier of a user to include in the group;

causing the group to be created and the user included in the group to be stored by communicating an indication of the group and the identifier of the user to a contact information system for storage;

receiving a user request, as part of the sharing workflow and via a user interface element of the dialog box, to share the collaboration project with the group; and causing, in response to the user request to share the collaboration project, an invitation to access the collaboration project to be sent to each member of the group.

18. The computing device of claim 17, the operations further including receiving, as part of the sharing workflow and via the dialog box, user input specifying a name of the group, and causing the name of the group to be saved as associated with the group by communicating the name of the group to the contact information system for storage.

19. The computing device of claim 17, the operations further comprising receiving a third user input, as part of the sharing workflow and via the dialog box, indicating only a project owner can edit the group, and causing an indication that only the project owner can edit the group to be associated with the group by communicating the indication that only the project owner can edit the group to the contact information system for storage.

20. The computing device of claim 17, the operations further comprising receiving a third user input, as part of the sharing workflow and via the dialog box, indicating members of the group can edit the group, and causing an indication that members of the group can edit the group to be associated with the group by communicating the indication that members of the group can edit the group to the contact information system for storage.

* * * * *